(12) United States Patent
Hirano

(10) Patent No.: US 7,983,193 B2
(45) Date of Patent: Jul. 19, 2011

(54) INFORMATION DISTRIBUTION SYSTEM, TERMINAL APPARATUS USED IN SAME SYSTEM AND RECORDING MEDIUM ON WHICH IS RECORDED A PROGRAM, AS WELL AS INFORMATION PROCESSING METHOD

(75) Inventor: Tadashi Hirano, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 180 days.

(21) Appl. No.: 12/149,084

(22) Filed: Apr. 25, 2008

(65) Prior Publication Data

US 2008/0291848 A1 Nov. 27, 2008

(30) Foreign Application Priority Data

May 23, 2007 (JP) .................. 2007-136798

(51) Int. Cl.
*H04L 12/28* (2006.01)
*G06F 17/30* (2006.01)
*G06F 12/00* (2006.01)

(52) U.S. Cl. .................. 370/254; 370/351; 707/797

(58) Field of Classification Search .................. None
See application file for complete search history.

(56) References Cited

U.S. PATENT DOCUMENTS

| | | | | |
|---|---|---|---|---|
| 6,134,599 A * | 10/2000 | Chiu et al. | ..... | 709/252 |
| 6,452,908 B1 * | 9/2002 | Yamada et al. | ..... | 370/256 |
| 2005/0283525 A1 * | 12/2005 | O'Neal et al. | ..... | 709/223 |
| 2006/0020694 A1 * | 1/2006 | Nag et al. | ..... | 709/223 |
| 2007/0133587 A1 * | 6/2007 | Hibino et al. | ..... | 370/428 |

FOREIGN PATENT DOCUMENTS

JP  A 2006-33514  2/2006

* cited by examiner

*Primary Examiner* — Xavier Szewai Wong
(74) *Attorney, Agent, or Firm* — Oliff & Berridge, PLC

(57) ABSTRACT

To provide an information distribution system which forms a tree-shaped hierarchical structure and distributes contents information, and in which it is possible for a connection destination of a terminal apparatus newly participating in a hierarchical structure of a distribution channel to be selected by a user of the terminal apparatus. A terminal apparatus, when participating in a hierarchical structure of a certain distribution channel, acquires information on the hierarchical structure, and displays participation statuses in the hierarchical structure of a plurality of terminal apparatus configuring the hierarchical structure in a predetermined topology information display area 22. A user of a terminal apparatus selects at least one terminal apparatus, among the plurality of terminal apparatus whose participation statuses are displayed, as a connection destination candidate, and connects the connection destination candidate as an upper layer terminal apparatus.

11 Claims, 15 Drawing Sheets

Fig. 1
(a) LOGICAL CONNECTION ASPECT
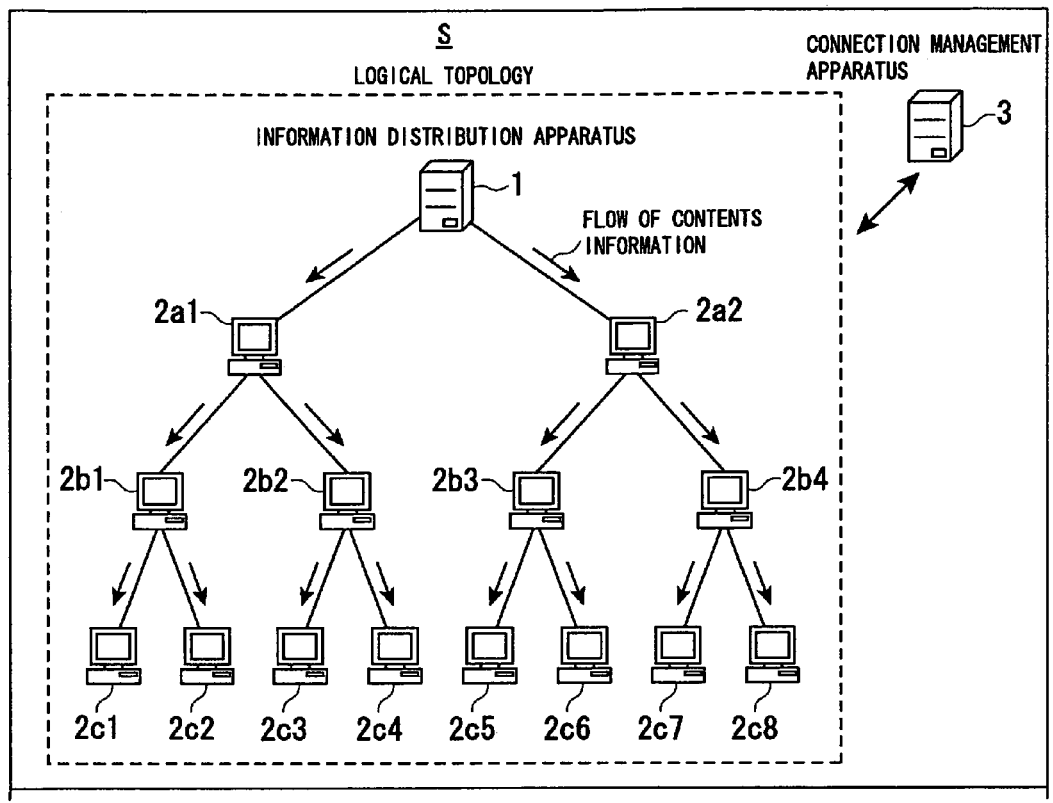
(b) PHYSICAL CONNECTION ASPECT
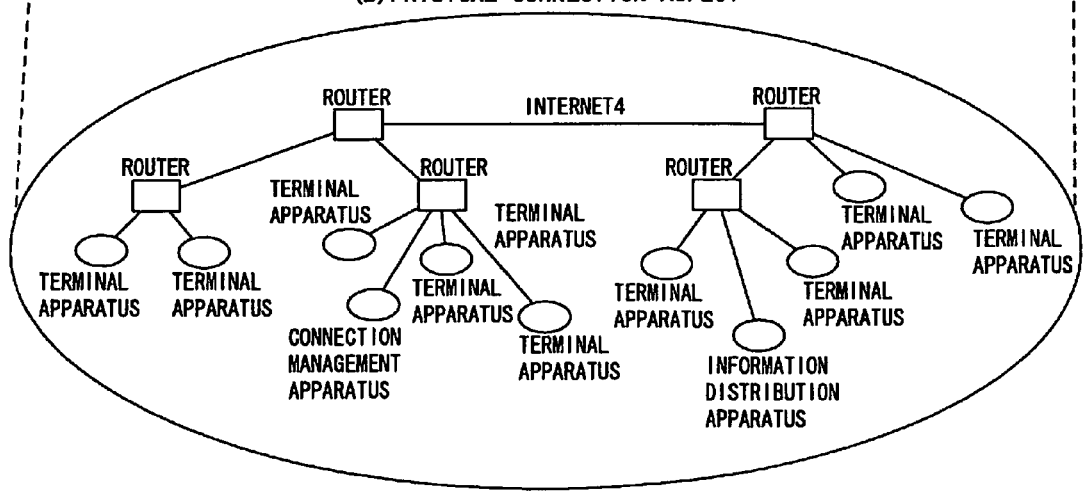

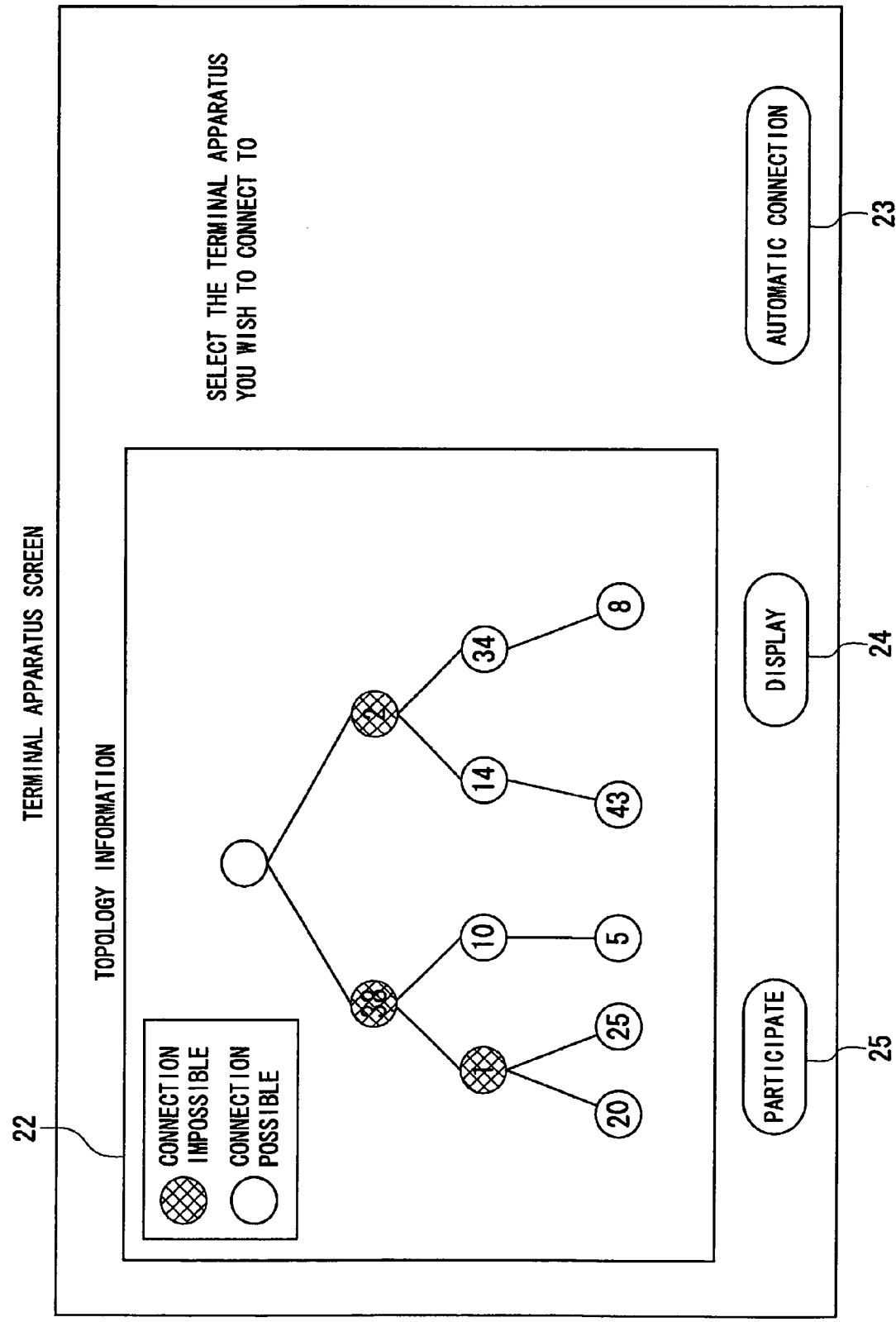

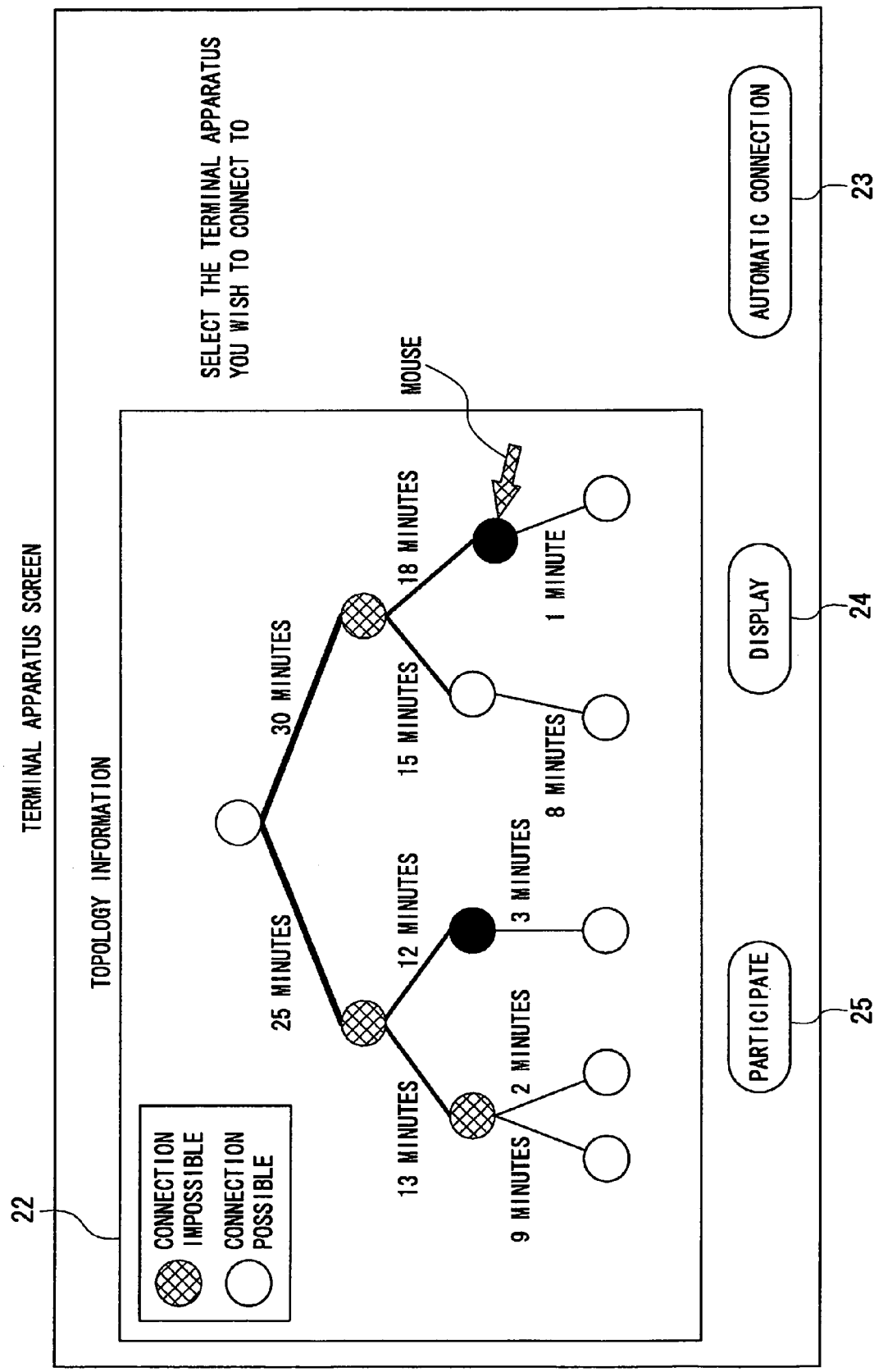

INFORMATION DISTRIBUTION SYSTEM, TERMINAL APPARATUS USED IN SAME SYSTEM AND RECORDING MEDIUM ON WHICH IS RECORDED A PROGRAM, AS WELL AS INFORMATION PROCESSING METHOD

CROSS-REFERENCE TO RELATED APPLICATION(S)

This application is based on and claims the benefit of priority from Japanese Patent Application No. 2007-136798 filed on May 23, 2007; the entire contents of which are incorporated herein by reference.

BACKGROUND OF THE INVENTION

1. Field of the Invention

The present invention relates to an information distribution system, a terminal apparatus used in the same system and a recording medium on which is recorded a program, as well as to an information processing method, and in particular to an information distribution system including an information distribution apparatus which distributes contents information via a network, a plurality of terminal apparatus which are logically connected, multilayered in a hierarchical structure on the network, with the information distribution apparatus as an apex, and a connection management apparatus which manages information on the hierarchical structure, wherein the contents information distributed from the information distribution apparatus is sequentially relayed to a lower layer terminal apparatus by means of a relaying function of the terminal apparatus, to a terminal apparatus used in the same system and a recording medium on which is recorded a program, as well as to an information processing method.

2. Description of the Related Art

In recent years, along with a spread of broadband, an information distribution service which distributes contents information has become popular. For example, as well as a service which distributes contents information in response to a request from a user, in the style of a VOD (Video On Demand), a service is known which distributes contents information in a broadcast format, in the style of an internet broadcast.

With this kind of information distribution service, a distribution aspect according to a client-server method has been predominant, but recently, as a new distribution aspect replacing this method, a distribution aspect of a tree-type topology format, which is a P2P (Person To Person) type of distribution aspect, has attracted attention.

The tree-type topology format is a distribution aspect in which a plurality of terminal apparatus are logically connected, multilayered in a tree-shaped hierarchical structure, with an information distribution apparatus which distributes contents information via a network such as the internet as an apex, and the contents information distributed from the information distribution apparatus is sequentially relayed to a lower layer terminal apparatus by means of a relaying function of the terminal apparatus (for example, refer to Japanese Unexamined Patent Publication No. 2006-33514).

In the distribution aspect of the tree-type topology format, when a terminal apparatus newly participates in (connects to) the tree-shaped hierarchical structure, it makes an inquiry to the connection management apparatus which manages the hierarchical structure, and is informed of a connection destination terminal apparatus (hereafter, also called a "connection destination candidate"). The connection management apparatus, when receiving an inquiry from a terminal apparatus which is attempting to newly participate in the hierarchical structure in this way, decides on a connection destination candidate of which to notify the terminal apparatus which is attempting to newly participate, taking into consideration a condition of the tree-shaped hierarchical structure (for example, an overall balance of the hierarchical structure and a condition of each terminal apparatus).

SUMMARY OF THE INVENTION

In the heretofore described related art, as the connection management apparatus decides on the connection destination of the terminal apparatus, it is not possible for a user of a terminal apparatus which is attempting to newly participate in the tree-shaped hierarchical structure to connect the terminal apparatus to a desired connection destination. When, for a terminal apparatus which is newly participating (hereafter, called a "newly participating terminal apparatus"), its connection destination tree structure is not stable, that is, in a kind of case in which a connection destination terminal apparatus of the newly participating terminal apparatus, or a terminal apparatus positioned on an upper layer thereof, frequently withdraws, there is a danger that a contents information reception condition in the newly participating terminal apparatus positioned on a lower layer thereof will worsen.

Therein, the invention being conceived in order to solve the heretofore described problem, it is desirable to provide an information distribution system in which it is possible for a connection destination of a terminal apparatus newly participating in the tree-shaped hierarchical structure to be selected by a user of the terminal apparatus, a terminal apparatus used in the same system and a program, as well as an information processing method.

According to an aspect of the invention, there is provided an information distribution system including: an information distribution apparatus which distributes contents information via a network; a plurality of terminal apparatus which are logically connected, multilayered in a hierarchical structure on the network, with the information distribution apparatus as an apex; and a connection management apparatus which manages information on the hierarchical structure, wherein the contents information distributed from the information distribution apparatus is sequentially relayed to a lower layer terminal apparatus by means of a relaying function of the terminal apparatus. In the information distribution system, the terminal apparatus includes: a hierarchical structure request section which, when participating in the hierarchical structure, requests the information on the hierarchical structure from the connection management apparatus; a hierarchical structure information display section which, based on the information on the hierarchical structure acquired from the connection management apparatus, displays participation statuses in the hierarchical structure of the plurality of terminal apparatus configuring the hierarchical structure; a connection position selection section which selects at least one terminal apparatus, among the plurality of terminal apparatus whose participation statuses are displayed in the hierarchical structure information display section, as a connection destination candidate of its own apparatus in the hierarchical structure; and a connection section which connects the selected connection destination candidate as an upper layer terminal apparatus, and the connection management apparatus includes: a hierarchical structure information storage section which stores the information on the hierarchical structure; and a hierarchical structure information transmission section which, in response to the request from the terminal apparatus, retrieves the information on the hierarchical structure from the hierarchical structure information storage section, and transmits it to the terminal apparatus.

BRIEF DESCRIPTION OF THE DRAWINGS

FIG. 1 is a diagram showing an outline configuration of an information distribution system according to a first embodiment;

FIG. 14 is a diagram showing an example of another screen displayed in a display portion of a non-participating terminal apparatus when the non-participating terminal apparatus participates in the information distribution system in another embodiment; and FIG. 15 is a diagram showing an example of a different screen displayed in a display portion of a non-participating terminal apparatus when the non-participating terminal apparatus participates in the information distribution system in another embodiment.

DESCRIPTION OF THE PREFERRED EMBODIMENT(S)

Figure 2:
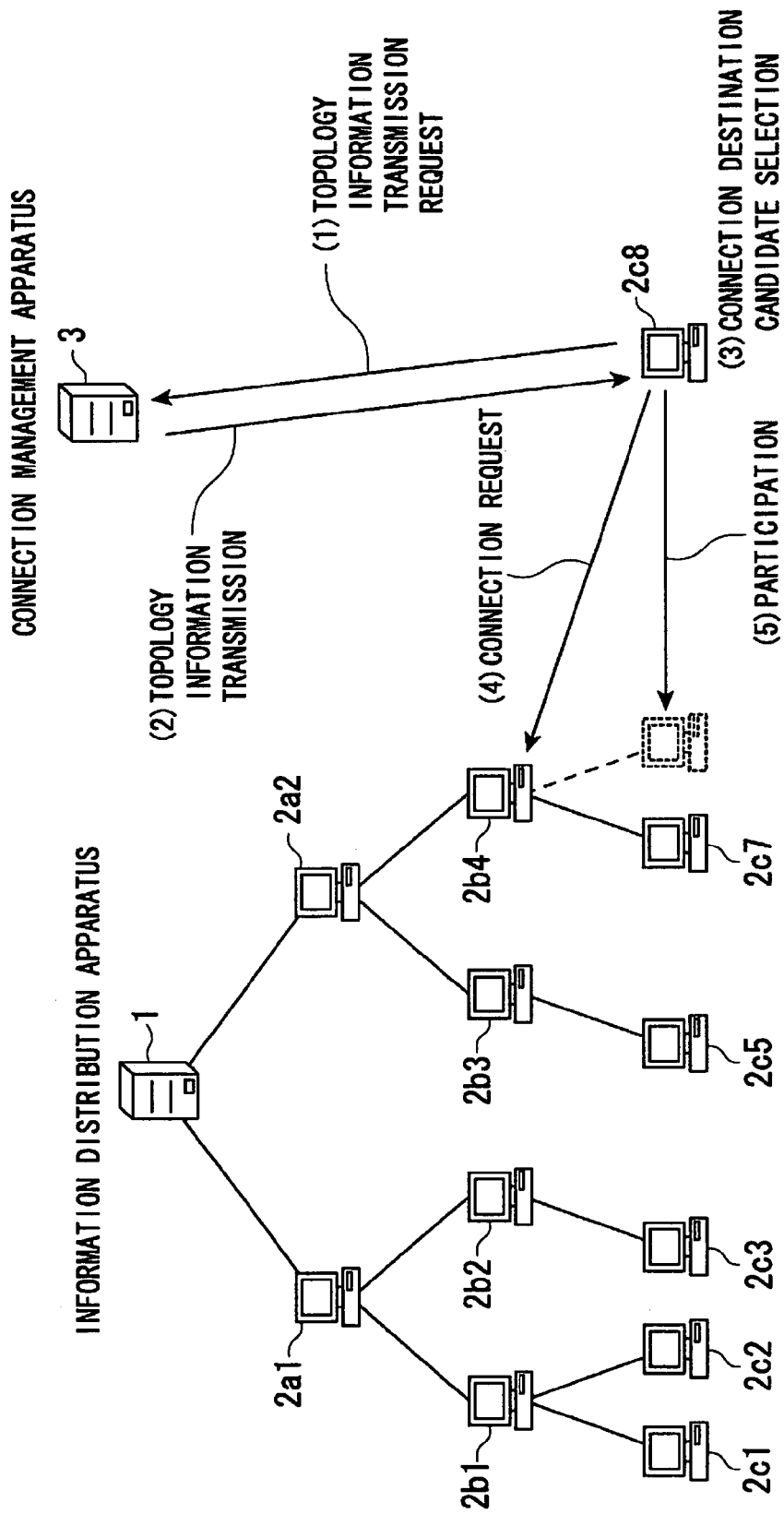
FIG. 2 is a diagram for illustrating operations when a non-participating terminal apparatus participates in the information distribution system.

1. First Embodiment 1.1. Configuration and the Like of Information Distribution System Firstly, a description will be given of an outline configuration of an information distribution system S, referring to FIG. 1. FIG. 1 is a diagram showing an outline configuration example of the information distribution system S according to the embodiment.

As shown in a of FIG. 1, the information distribution system S according to the embodiment includes an information distribution apparatus 1, which distributes contents information such as music data, image data or document data via a network, a plurality of terminal apparatus $2a1$, $2a2$, $2b1$ to $2b4$, and $2c1$ to $2c8$, which are logically connected, multilayered in a tree-shaped hierarchical structure (hereafter called the "tree-shaped hierarchical structure") on the network, with the information distribution apparatus 1 as an apex, and a connection management apparatus 3, which manages the tree-shaped hierarchical structure. Although the tree-shaped hierarchical structure is configured for each distribution channel, in a of FIG. 1, in order to facilitate understanding, only the hierarchical structure of one distribution channel is displayed. Also, although a number of terminal apparatus is taken here to be 14, this is not limiting.

An IP address being allotted to each of the information distribution apparatus 1, the terminal apparatus $2a1$, $2a2$, $2b1$ to $2b4$, and $2c1$ to $2c8$, and the connection management apparatus 3, these apparatus are connected to an internet 4, as an example of the network, via a router or the like, as shown in b of FIG. 1. A communication connection between these apparatus is possible by means of transmitting a packet, including a header which makes an IP address of an objective connection destination terminal apparatus a destination IP address, and an IP address of its own apparatus a transmission source IP address. Then, the information distribution apparatus 1, and the terminal apparatus $2a1$, $2a2$, $2b1$ to $2b4$, and $2c1$ to $2c8$, being logically connected by establishing sessions between the apparatus, the tree-shaped hierarchical structure is constructed as shown in a of FIG. 1. Also, although a description is given here separating the information distribution apparatus 1 and the connection management apparatus 3, it is also acceptable to arrange in such a way as to have the connection management apparatus 3 inside the information distribution apparatus 1. In this case, it is possible, not allotting an IP address to the connection management apparatus 3, that it shares an IP address with the information distribution apparatus 1. When indicating anyone or all of the terminal apparatus $2a1$, $2a2$, $2b1$ to $2b4$, and $2c1$ to $2c8$, it may happen, for the sake of convenience, that it or they are expressed as a terminal apparatus 2.

The information distribution system S is managed, in each distribution channel, by the connection management apparatus 3 in such a way that the plurality of the terminal apparatus 2 are logically connected multilayered in the tree-shaped hierarchical structure, with the information distribution apparatus 1 as the apex. The information distribution apparatus 1 of each distribution channel transmits contents information to the terminal apparatus $2a1$ and $2a2$. The terminal apparatus $2a1$ and $2a2$, on receiving the contents information from the information distribution apparatus 1 on an upper layer, relay the received contents information to the terminal apparatus $2b1$ to $2b4$ on a lower layer. In the same way, the terminal apparatus $2b1$ to $2b4$, on receiving the contents information, relay the received contents information to the terminal apparatus $2c1$ to $2c8$ on a lower layer. While it is acceptable to provide an information distribution apparatus 1 in each distribution channel, it is also acceptable to arrange in such a way as to distribute contents information of all the distribution channels in the same information distribution apparatus. Also, the same applying to the connection management apparatus 3, while it is acceptable to provide one in each distribution channel, it is also acceptable to arrange in such a way as to manage tree-shaped hierarchical structures of all the distribution channels in the same connection management apparatus.

In this way, in the information distribution system S, the contents information distributed from the information distribution apparatus 1 in each distribution channel is relayed sequentially, by a relaying function of the terminal apparatus 2, to the terminal apparatus 2 on the lower layers, and the contents information is distributed to all of the terminal apparatus 2, participating in the information distribution system S, which configure the tree-shaped hierarchical structure. As well as contents data such as music or a movie, information on a reproduction time (hereafter called "reproduction time data") is included in the distributed contents information. Then, the plurality of terminal apparatus 2 which receive the contents information carry out a reproduction of the sequentially transmitted contents information, based on reproduction time data. By so doing, in the information distribution system S, the contents information transmitted from the information distribution apparatus 1 being distributed to the plurality of terminal apparatus 2, it is possible to reproduce the contents information at the same time in the plurality of terminal apparatus 2. That is, using a P2P, a broadcast format streaming distribution to the plurality of terminal apparatus 2 is realized.

1.2. Information Distribution System Participation Method

Figure 3:
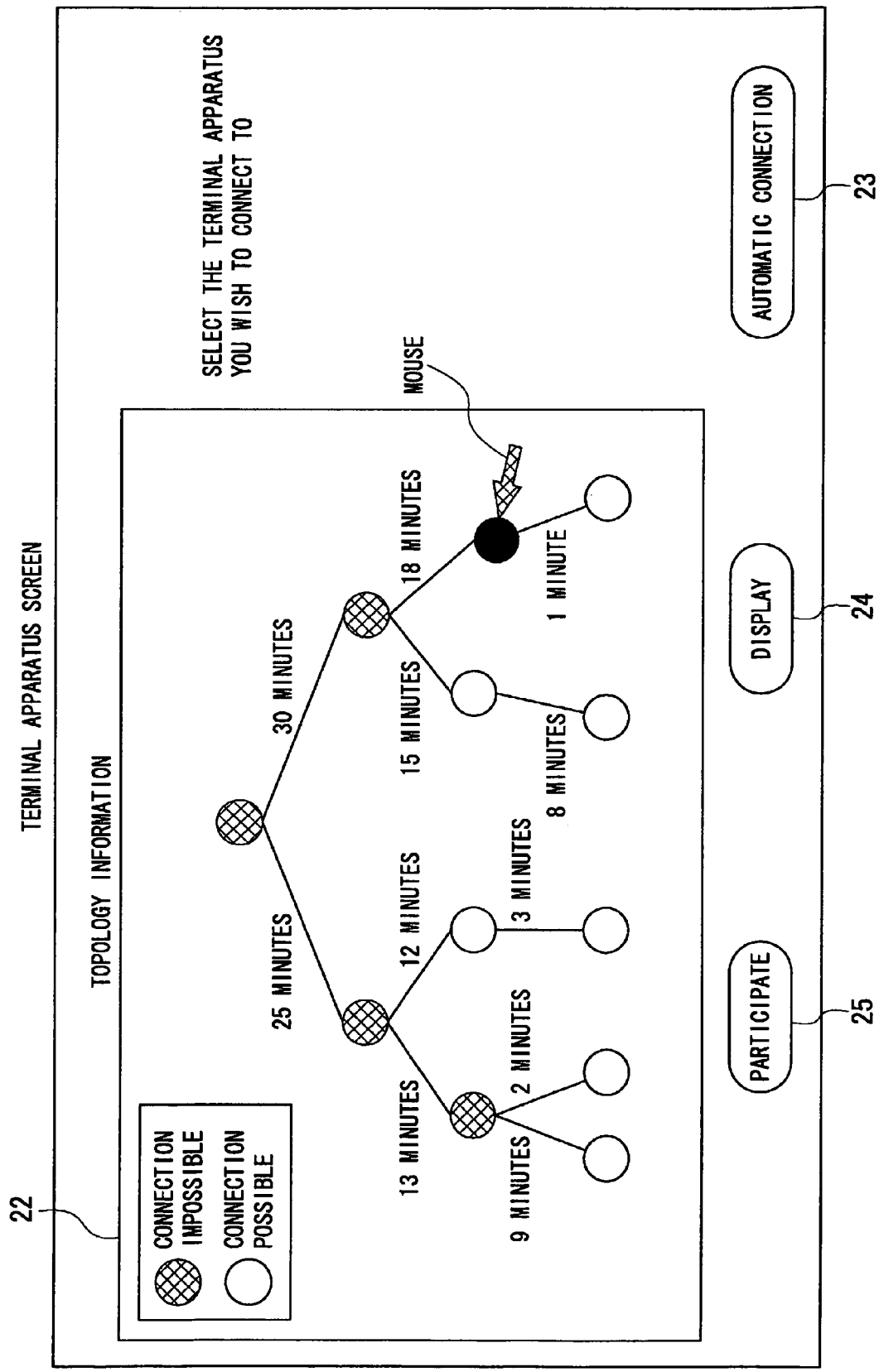
FIG. 3 is a diagram showing an example of a screen displayed in a display portion of the non-participating terminal apparatus when the non-participating terminal apparatus participates in the information distribution system in the first embodiment.
Figure 4:
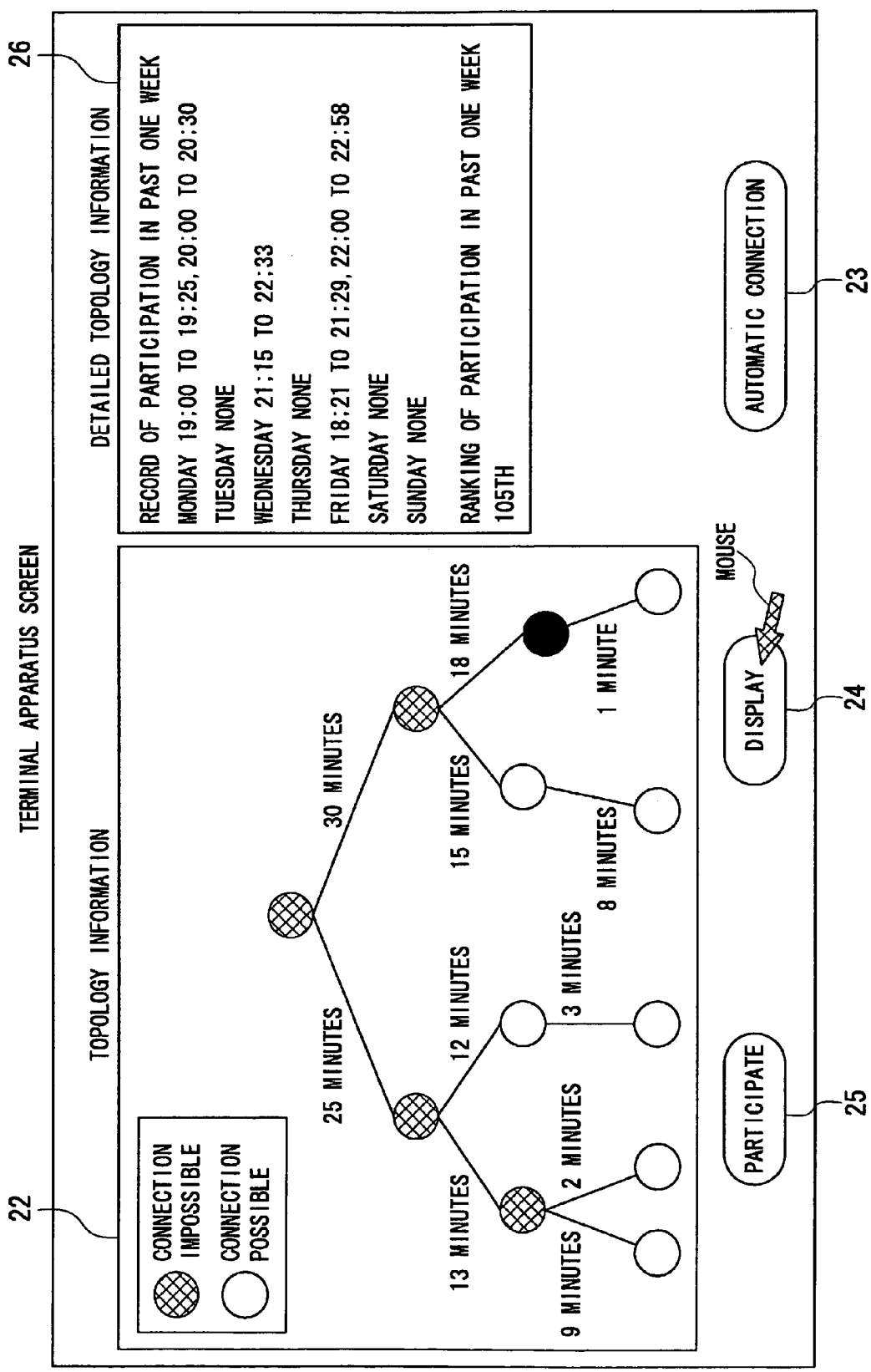
FIG. 4 is a diagram showing an example of a screen displayed in the display portion of the non-participating terminal apparatus when the non-participating terminal apparatus participates in the information distribution system in the first embodiment.

Next, a specific description will be given, with reference to FIGS. 2 to 4, of operations when a terminal apparatus which is not participating in the tree-shaped hierarchical structure of any of the distribution channels of the information distribution system S (hereafter called a "non-participating terminal apparatus") participates in the tree-shaped hierarchical structure of any one of the distribution channels of the information distribution system S. FIG. 2 is a diagram for illustrating operations of a non-participating terminal apparatus participating in the tree-shaped hierarchical structure, while FIGS. 3 and 4 are diagrams showing examples of screens displayed in a display portion of the non-participating terminal apparatus when the non-participating terminal apparatus participates in the tree-shaped hierarchical structure. The following operations are realized by information processing by a controller of the terminal apparatus 2 and a controller of the connection management apparatus 3.

As shown in FIG. 2, when the non-participating terminal apparatus 2c8 attempts to participate in the tree-shaped hierarchical structure of a certain distribution channel in the information distribution system S, the non-participating terminal apparatus 2c8, firstly, requests of the connection management apparatus 3 a transmission of information (hereafter called "topology information") on the tree-shaped hierarchical structure in which it is attempting to participate (refer to (1) shown in FIG. 2).

The connection management apparatus 3, on receiving the topology information transmission request from the non-participating terminal apparatus 2c8, transmits topology information corresponding to the transmission request to the non-participating terminal apparatus 2c8 (refer to (2) in FIG. 2).

On receiving the topology information from the connection management apparatus 3, the non-participating terminal apparatus 2c8, based on the topology information, displays a participation status of each terminal apparatus 2 already participating in the tree-shaped hierarchical structure in which it is attempting to participate. A user of the non-participating terminal apparatus 2c8, referring to the participation status of each terminal apparatus 2 displayed in this way, selects a desired terminal apparatus (refer to (3) in FIG. 2).

Herein, as well as tree-shaped hierarchical structure connection position information for each terminal apparatus 2 (information indicating which terminal apparatus is connected to which terminal apparatus), a current time of participation, record of participation and ranking of participation in the tree-shaped hierarchical structure for each terminal apparatus 2 are included in the topology information.

The "current time of participation" indicating how long a condition of each terminal apparatus 2 configuring a portion of the tree-shaped hierarchical structure has continued, in the embodiment, it is counted in sections of one minute, by the connection management apparatus 3, for each terminal apparatus 2.

The "record of participation" being the record of participation in the tree-shaped hierarchical structure for each terminal apparatus 2, each time of participation from participating in until withdrawing from the tree-shaped hierarchical structure in, for example, the past one week, is included. In the embodiment, it is recorded in sections of one minute, by the connection management apparatus 3, for each terminal apparatus 2.

The "ranking of participation", ranking the terminal apparatus 2 in a descending order of frequency of participation in the tree-shaped hierarchical structure, is a number attached by the connection management apparatus 3, in order from number one, to a terminal apparatus 2 which is qualified to participate in the tree-shaped hierarchical structure. Herein, the frequency of participation in the tree-shaped hierarchical structure means a time of participating in the tree-shaped hierarchical structure (hereafter called a "total participation time") in a past predetermined period but, in the event of two terminal apparatus 2 having the same total participation time, the one with a longer average time from participating in until withdrawing from the tree-shaped hierarchical structure (hereafter called a "continuous participation time") is given a higher ranking.

On receiving this kind of topology information from the connection management apparatus 3, the non-participating terminal apparatus 2c8, as heretofore described, displays the participation status of each terminal apparatus 2 in the tree-shaped hierarchical structure, based on the topology information. As the participation status of each terminal apparatus 2 is displayed in this way, the user of the non-participating terminal apparatus 2c8, based on the participation status, being able to connect an appropriate terminal apparatus as an upper layer apparatus, can select a connection to a stable tree structure.

At this time, as shown in FIG. 3, information corresponding to the topology information being displayed on the screen of the display portion of the non-participating terminal apparatus 2c8, in a topology information display area 22 thereof, various kinds of button 23 to 25 are displayed in another area.

Specifically, a condition of the tree-shaped hierarchical structure is displayed in the topology information display area 22, with the plurality of terminal apparatus 2, participating in the tree-shaped hierarchical structure of the distribution channel, which are to receive the distribution of the contents information as "nodal images" (images displayed as circles in the topology information display area 22), and connections between the information distribution apparatus 1 and the terminal apparatus 2, and between the terminal apparatus 2, as "branch images" (images of lines linking the nodal images). Furthermore, a current time of participation in the tree-shaped hierarchical structure of a terminal apparatus 2 corresponding to a "nodal image" connected on a lower layer by the branch is displayed in an area neighboring each branch.

Also, the automatic connection button 23 for selecting an automatic connection, the display button 24 for displaying a record of participation and ranking of participation of a terminal apparatus 2 corresponding to a nodal image selected by means of an input portion of the non-participating terminal apparatus 2c8, such as a mouse or keyboard, and the participate button 25 for participating in the tree-shaped hierarchical structure, with the terminal apparatus 2 corresponding to the nodal image selected by means of the input portion of the non-participating terminal apparatus 2c8 as a connection destination upper layer apparatus, are displayed in the other area as a Graphical User Interface (GUI).

In a condition in which the topology information is displayed in the display portion, as in FIG. 3, the user of the non-participating terminal apparatus 2c8, using the input portion such as the mouse or keyboard, selects a desired nodal image from among the plurality of nodal images displayed in the topology information display area 22. However, those among the nodal images which are displayed as shaded circles represent terminal apparatus to which no further terminal apparatus can be connected on a lower layer, and cannot be selected. Also, an apical image in the tree-shaped hierarchical structure displayed in the topology information display area 22 represents the information distribution apparatus 1. Herein, the information distribution apparatus 1 is also displayed as an image shown as a circle, in the same way as the terminal apparatus 2.

On the nodal image being selected by means of an operation of the input portion by the user, the non-participating terminal apparatus 2c8 causes the selected nodal image (herein, taken to be the nodal image corresponding to the terminal apparatus 2b4 shown in FIG. 2) to be changed from an image of a blank circle to an image of a colored filled-in circle, and displayed. In this condition, on the display button 24 being depressed by means of an operation of the input portion by the user, the non-participating terminal apparatus 2c8, as shown in FIG. 4, displays a record of participation and ranking of participation in the tree-shaped hierarchical structure of the terminal apparatus 2b4 corresponding to the selected nodal image in a detailed topology information display area 26 of the display portion. By this means, when participating in the tree-shaped hierarchical structure of the desired distribution channel, it is possible to select the terminal apparatus to be connected as the upper layer apparatus taking into account not only the current time of participation of each terminal apparatus 2, but also its record of participation and ranking of participation.

In a condition in which the screen shown in FIG. 3 or the screen shown in FIG. 4 is displayed in the display portion, on the user of the non-participating terminal apparatus 2c8 depressing the participate button 25 by means of an operation of the input portion, the non-participating terminal apparatus 2c8 participates in the tree-shaped hierarchical structure, with the terminal apparatus 2b4 corresponding to the selected nodal image as a connection destination candidate.

That is, the non-participating terminal apparatus 2c8 asks the connection management apparatus 3 for location information (an IP address and the like) of the terminal apparatus 2b4. The connection management apparatus 3 retrieves from a memory the location information of the terminal apparatus 2b4, which is the connection destination candidate, requested by the non-participating terminal apparatus 2c8, and transmits it to the non-participating terminal apparatus 2c8, which is the request source. The non-participating terminal apparatus 2c8, based on the location information of the terminal apparatus 2b4 transmitted from the connection management apparatus 3 in this way, asks the terminal apparatus 2b4 for a connection on the layer below it (refer to (4) shown in FIG. 2), and participates in the tree-shaped hierarchical structure, with the terminal apparatus 2b4 as the upper layer apparatus (refer to (5) shown in FIG. 2). By this means, it becomes possible for the terminal apparatus 2c8 to acquire the contents information distributed from the information distribution apparatus 1.

Although the user of the non-participating terminal apparatus can, in the way heretofore described, referring to the participation status of each terminal apparatus 2 participating in the tree-shaped hierarchical structure of the information distribution system S, decide an appropriate position of participation in the tree-shaped hierarchical structure, it is also possible to carry out an automatic connection, which selects a connection destination candidate by means of the connection management apparatus 3, without the user selecting the connection destination candidate.

The automatic connection is started by, for example, in a condition in which the screen shown in FIG. 3 or the screen shown in FIG. 4 is displayed in the display portion, the user of the non-participating terminal apparatus 2c8 selecting the automatic connection button 23 by means of an operation of the input portion. On the automatic connection button 23 being selected, the non-participating terminal apparatus 2c8 transmits a connection destination introduction request to the connection management apparatus 3. The connection destination introduction request includes information (for example, a distribution channel number) on the distribution channel to which the non-participating terminal apparatus 2c8 is attempting to connect. The connection management apparatus 3, on receiving the connection destination introduction request from the non-participating terminal apparatus 2c8, based on a condition and the like of the tree-shaped hierarchical structure of the distribution channel relevant to the request, selects a connection destination candidate (the information distribution apparatus 1 or a terminal apparatus 2) to be connected as an upper layer apparatus of the tree-shaped hierarchical structure in order that the terminal apparatus 2 can receive the distribution of the contents information. Then, the connection management apparatus 3 notifies the terminal apparatus 2 of location information of the connection destination candidate selected in this way. The terminal apparatus 2, on receiving the location information of the connection destination candidate from the connection management apparatus 3, requests a participation in (a connection to) the tree-shaped hierarchical structure of the connection destination candidate, by which means the terminal apparatus 2 is embedded in the tree-shaped hierarchical structure of the desired distribution channel.

In this way, when the non-participating terminal apparatus participates in the tree-shaped hierarchical structure of the desired distribution channel, as it is possible for the user of the non-participating terminal apparatus to ascertain the participation status of each terminal apparatus 2, and select the connection destination candidate him or herself, and also possible to cause the selection of the connection destination candidate by means of the connection management apparatus 3, it being possible for the user him or herself to select a participation method which accords with the user's preference, it is possible to increase the user's convenience.

1.3. Specific Configuration and Operations of Terminal Apparatus

Next, a description will be given of a configuration and operations of the terminal apparatus 2, referring to the drawings.

Terminal Apparatus Configuration

Figure 5:
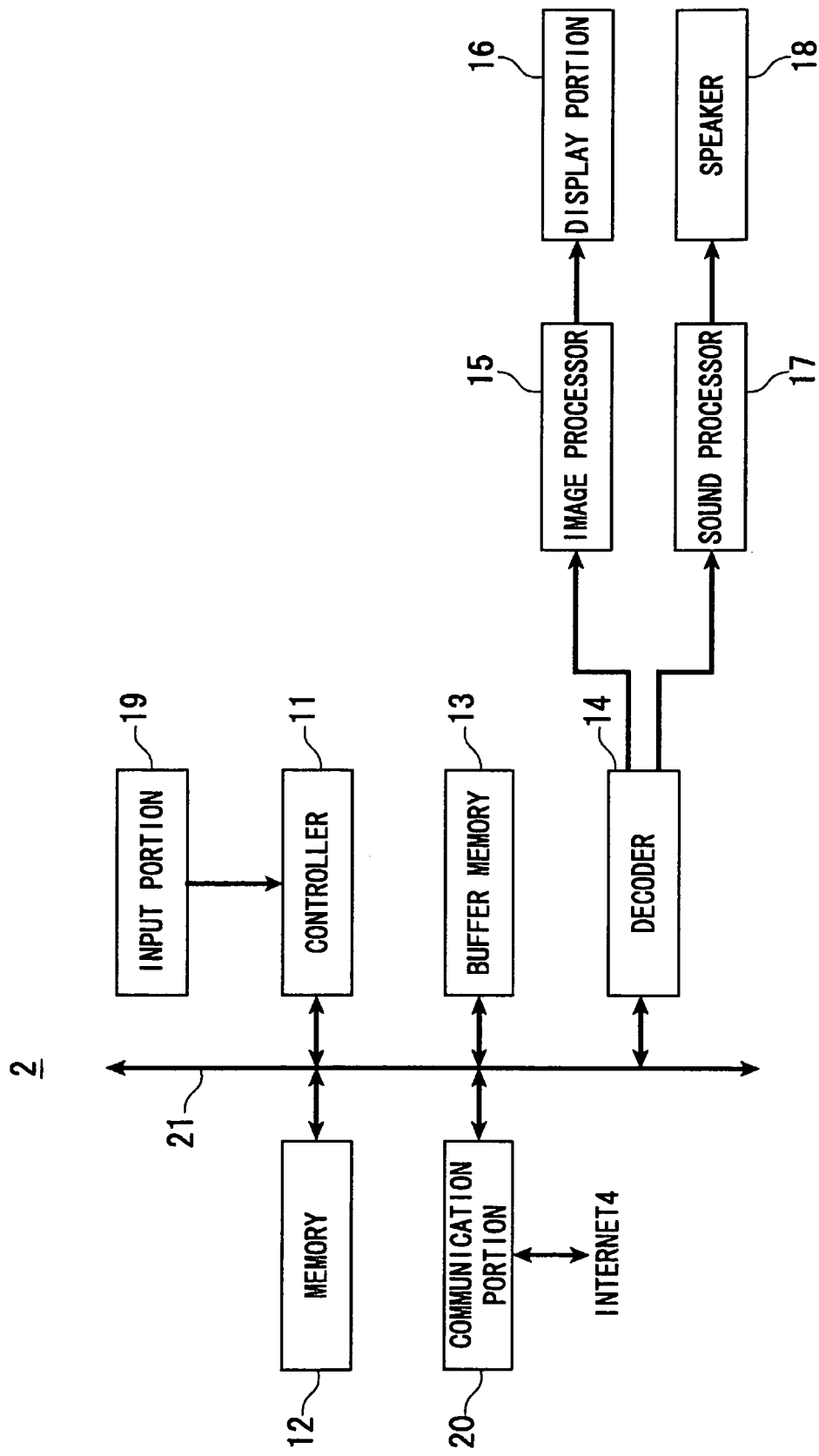
FIG. 5 is a diagram showing an outline configuration of a terminal apparatus.

Firstly, a description will be given of the configuration of the terminal apparatus 2. FIG. 5 is a diagram showing an outline configuration of the terminal apparatus 2 in the information distribution system S according to the embodiment.

The terminal apparatus 2, a general personal computer, as well as a designated computer, being applicable, as shown in FIG. 5, includes a controller 11, a rewritable memory 12, which stores information and the like acquired from the information distribution apparatus 1, other terminal apparatus 2 or the connection management apparatus 3, a buffer memory 13, which temporarily stores contents information acquired from the information distribution apparatus 1 or the other terminal apparatus 2, a decoder 14, which sequentially retrieves and decodes the contents information stored in the buffer memory 13, an image processor 15, which carries out a process converting video information (including document information) among the contents information decoded by the decoder 14 into information displayable on the display portion 16, to be described hereafter, the display portion 16 (corresponding to one example of a hierarchical structure information display section), such as a liquid crystal display device (LCD), which displays an image based on an output from the image processor 15, a sound processor 17, which carries out a process converting audio information among the contents information decoded by the decoder 14 into information transmittable as sound waves from a speaker 18, to be described hereafter, the speaker 18, which transmits sound waves based on an output from the sound processor 17, the input portion 19, configured of the mouse, the keyboard or the like, and a communication portion 20 for communicating with the information distribution apparatus 1, the other terminal apparatus 2 or the connection management apparatus 3, via the internet 4. The controller 11, the memory 12, the buffer memory 13, the decoder 14 and the communication portion 20 are mutually connected via a system bus 21.

The controller 11 is configured of a CPU (Central Processing Unit), an internal ROM (Read Only Memory), and an internal RAM (Random Access Memory). An information processing program for participating in the tree-shaped hierarchical structure of the information distribution system S, and acquiring the contents information, being stored in the internal ROM, the CPU, by retrieving and executing the information processing program stored in the internal ROM, functions as a hierarchical structure request section, a hierarchical structure information display processing section, a connection section, a relay section and the like, to be described hereafter.

It is acceptable both that the information processing program is, for example, downloaded into the internal ROM of the controller 11 from a server (for example, the connection management apparatus 3) connected to the internet 4, via the communication portion 20, and that, after being recorded on a computer readable recording medium such as a CD-ROM, it is written onto the internal ROM of the controller 11 via an unshown recording medium drive. In this case, it is desirable that the internal ROM is configured of a flash memory or the like.

Terminal Apparatus Operations

A specific description will be given of the operations of the terminal apparatus 2 configured in the heretofore described way. FIGS. 6 to 9 are flowcharts showing operational details of the terminal apparatus 2. Each of the following processes is executed by the controller 11 of the terminal apparatus 2 functioning as the heretofore described sections and the like.

Figure 6:
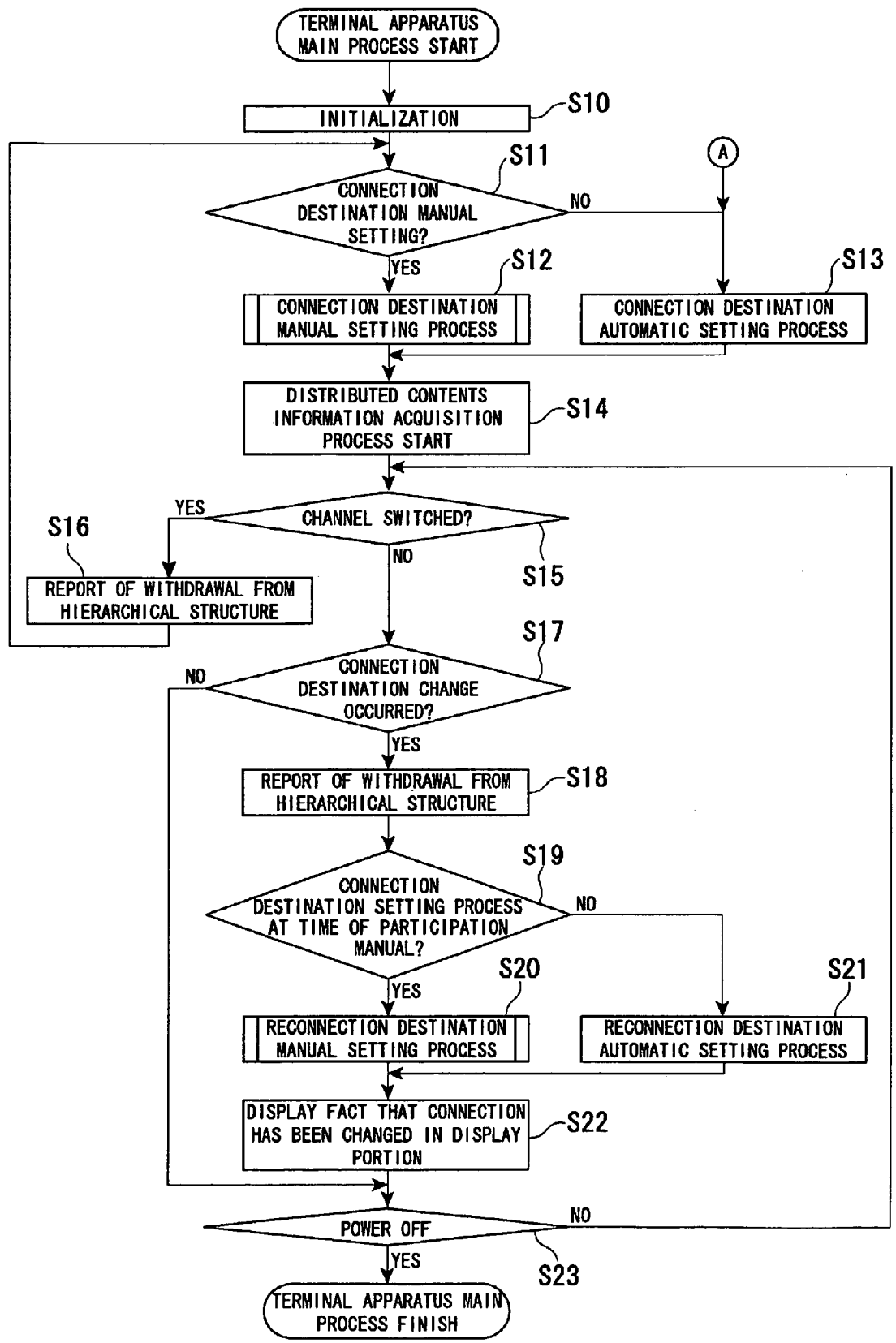
FIG. 6 is a flowchart showing operational details of the terminal apparatus.

As shown in FIG. 6, when a main power switch (not shown) is activated, or when a reset switch (not shown) is operated, on the terminal apparatus 2, the CPU of the controller 11 executes an initial setting operation of access permission for the memory 12, internal RAM working area allocation and the like, retrieves the information processing program stored in the internal ROM and, after putting the functions as the controller 11 in an operating condition (step S10), displays an initial screen for participating in the information distribution system S in the display portion 16, and moves the process to step S11.

The initial screen displayed in the display portion 16 is a screen for deciding whether to carry out the participation in the information distribution system S manually or automatically. That is, the initial screen is a screen for selecting either a connection destination manual setting, with which a user of the terminal apparatus 2 selects a connection destination in the tree-shaped hierarchical structure of the information distribution systems, or a connection destination automatic setting, with which the connection management apparatus 3 decides a connection destination in the tree-shaped hierarchical structure of the information distribution system S. The user of the terminal apparatus 2, by operating the mouse and keyboard of the input portion 19, selects either the connection destination manual setting or the connection destination automatic setting on the initial screen. In the embodiment, it is taken that, when participating in the information distribution system S, a distribution channel to be connected first (hereafter, called a "default distribution channel") is determined by an advance setting, but it is also acceptable to select a distribution channel on the initial screen.

In step S11, the controller 11 determines whether or not the user of the terminal apparatus 2 has selected the connection destination manual setting. In this process, if it is determined that the connection destination manual setting has been selected (step S11: Yes), the controller 11 executes a connection destination manual setting process (step S12). The connection destination manual setting process, being a process of steps S31 to S42 in FIG. 7, will be described in detail hereafter.

Meanwhile, if it is determined that the connection destination automatic setting has been selected, without the connection destination manual setting being selected (step S11: No), the controller 11 executes a connection destination automatic setting process (step S13). The connection destination automatic setting process, being a process of steps S50 to S53 in FIG. 8, will be described in detail hereafter.

On executing the connection destination setting process of step S12 or S13, and participating in the tree-shaped hierarchical structure, the controller 11 starts an acquisition of contents information distributed from an upper layer apparatus (the information distribution apparatus 1 or another terminal apparatus 2) connected via the communication portion 20. The controller 11 temporarily stores the contents information acquired from the upper layer apparatus in the buffer memory 13. The contents information sequentially stored in the buffer memory 13 is sequentially input into the decoder 14 by the controller 11, and reproduced. That is, in the event that the contents information includes, for example, music data, after the music data are decoded by the decoder 14, a predetermined process is performed on them by the sound processor 17, and they are transmitted from the speaker 18 as sound waves. Also, in the event that the contents information includes, for example, image data, after the image data are decoded by the decoder 14, a predetermined process is performed on them by the image processor 15, and they are displayed as images in the display portion 16.

Also, in the event that there is a lower layer terminal apparatus 2 connected via the communication portion 20, the contents information acquired from the upper layer apparatus is relayed to the lower layer terminal apparatus 2. That is, when there is a terminal apparatus 2 connected on the lower layer, the controller 11 functions as the relay section which sequentially retrieves the contents information, acquired from the upper layer apparatus, stored in the buffer memory 13, and transmits the contents information to the lower layer terminal apparatus 2.

After starting a process of step S14, the controller 11 displays a distribution channel switching screen (not shown) in the display portion 16, and determines whether or not there is a distribution channel switching instruction from the user (step S15). A distribution channel switching button (not shown) being displayed on the distribution channel switching screen in a Graphical User Interface (GUI) format, the user, by selecting the distribution channel switching button using the input portion 19, can switch the distribution channel.

In the process, if it is determined that there has been a distribution channel switching instruction from the user (step S15: Yes), the controller 11 carries out a process causing its own terminal apparatus to withdraw from the tree-shaped hierarchical structure in the distribution channel in which it is currently participating. The withdrawal from the tree-shaped hierarchical structure is executed by making a severance request via the communication portion 20 to the terminal apparatus 2 connected on the upper layer and the terminal apparatus 2 connected on the lower layer. At this time, the terminal apparatus 2 connected on the lower layer also withdraws from the tree-shaped hierarchical structure, but it reconnects to the tree-shaped hierarchical structure from which it has withdrawn by executing a process of steps S50 to S53, to be described hereafter, or a process of steps S60 to S63, to be described hereafter.

After withdrawing from the tree-shaped hierarchical structure in this way, the controller 11 makes a withdrawal report to the connection management apparatus 3 via the communication portion 20 (step S16). Information (a terminal identification number and location information) relating to its own terminal apparatus 2, and information on the distribution channel from which it has withdrawn, are included in the withdrawal report. Subsequently, shifting to step S11, the controller 11 decides whether to carry out a participation in the tree-shaped hierarchical structure of a distribution channel which is a switching destination manually or automatically.

Meanwhile, if it is determined that there is no distribution channel switching instruction from the user (step S15: No), the controller 11 determines whether or not a change of connection destination has occurred (step S17). For example, when a severance request has been received from a terminal apparatus 2 connected on an upper layer of the tree-shaped hierarchical structure, or when a connection with a terminal apparatus 2 connected on an upper layer of the tree-shaped hierarchical structure has become unstable, the controller 11 determines that a change of connection destination has occurred. In the process, if it determines that a change of connection destination has occurred (step S17: Yes), the controller 11 severs a session (connection) established with the upper layer apparatus connected via the communication portion 20. By this means, the controller 11 withdraws its own terminal apparatus from the distribution channel in which it is currently participating. After withdrawing from the tree-shaped hierarchical structure in this way, the controller 11 makes a withdrawal report to the connection management apparatus 3 via the communication portion 20 (step S18).

Next, the controller 11 determines whether or not the connection destination setting process when connecting to the tree-shaped hierarchical structure in which it is participating has been a connection destination manual setting process (step S19). In the process, if it determines that it has been a connection destination manual setting process (step S19: Yes), the controller 11 executes a reconnection destination manual setting process (step S20). The reconnection destination manual setting process, being a process of steps S60 to S63 in FIG. 9, will be described in detail hereafter.

Meanwhile, if it determines, in step S19, that the connection destination setting process when connecting to the tree-shaped hierarchical structure in which it is participating has been a connection destination automatic setting process, rather than a connection destination manual setting process (step S19: No), the controller 11 executes a reconnection destination automatic setting process (step S21). The reconnection destination automatic setting process is the same kind of process as the process of steps S50 to S53 in FIG. 8.

When the reconnection destination setting process of step S20 or S21 is completed, the controller 11 displays the fact that the connection has been changed in the display portion 16. That is, the controller 11 displays, in the display portion 16, the fact that there has been a change in a position of its own terminal apparatus in the tree-shaped hierarchical structure in the distribution channel in which it is receiving the distribution of the contents information (step S22).

When it is determined, in step S17, that no change of the connection destination has occurred (step S17: No), or when the process of step S22 is completed, the controller 11 determines whether or not the power of its own terminal apparatus has shifted to an inactivated condition (step S23).

If it determines, in step S23, that the power of its own terminal apparatus has shifted to the inactivated condition (step S23: Yes), the controller 11 completes the main process, while if it determines that the power of its own terminal apparatus has not shifted to the inactivated condition (step S23: No), the controller 11 repeats the process from step S15.

Figure 7:
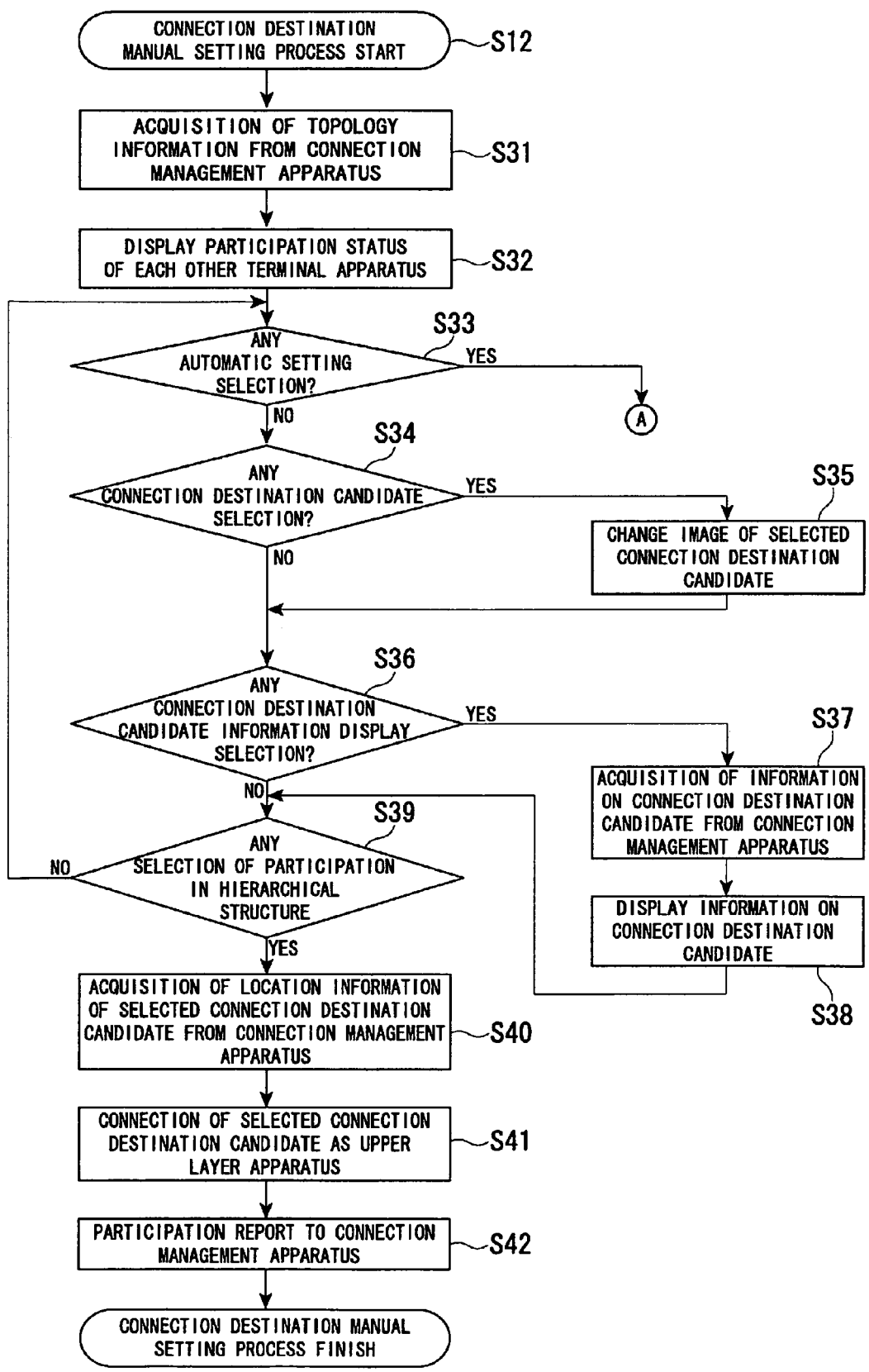
FIG. 7 is a flowchart showing operational details of the terminal apparatus.

Next, a specific description will be given of the connection destination manual setting process in step S12, referring to the flowchart of FIG. 7. FIG. 7 is a flowchart of the connection destination manual setting process in the terminal apparatus 2.

As shown in FIG. 7, on starting the connection destination manual setting process, the controller 11 requests topology information from the connection management apparatus 3 via the communication portion 20, and acquires the topology information transmitted from the connection management apparatus 3 in response to the request via the communication portion 20 (step S31). In this way, the controller 11 functions as the hierarchical structure request section which, when participating in the tree-shaped hierarchical structure, requests the topology information, which is information on the tree-shaped hierarchical structure, from the connection management apparatus 3.

Next, the controller 11, based on the topology information acquired from the connection management apparatus 3 in this way, displays the participation status of each terminal apparatus 2 participating in the tree-shaped hierarchical structure of the information distribution system S in the display portion 16 (step S32). As details of the display have already been described heretofore (for example, refer to the description of FIGS. 3 and 4), a description will be omitted here. In this way, the controller 11 functions as the hierarchical structure information display processing section which, based on the topology information acquired from the connection management apparatus 3, displays the participation status in the hierarchical structure of the plurality of terminal apparatus 2 configuring the hierarchical structure in the display portion 16, which acts as a hierarchical structure information display section. Consequently, a user of a terminal apparatus which is attempting to participate in the tree-shaped hierarchical structure of a distribution channel in which he or she wishes to receive the distribution of the contents information, being able to refer to the participation status of each terminal apparatus 2 participating in the tree-shaped hierarchical structure, can decide an appropriate position of participation in the tree-shaped hierarchical structure.

Next, the controller 11 determines whether or not a selection of the automatic setting has been carried out (step S33). For example, in a condition in which the kind of screen shown in FIG. 3 or FIG. 4 is displayed in the display portion 16, when the user of its own terminal apparatus selects the automatic connection button 23 by means of an operation of the input portion 19, the controller 11 determines that a selection of the automatic setting has been carried out. In the process, if the controller 11 determines that no selection of the automatic setting has been carried out (step S33: No), it shifts the process to step S34, while if it determines that a selection of the automatic setting has been carried out (step S33: Yes), it shifts the process to step S13 (refer to FIG. 6).

In step S34, the controller 11 determines whether or not a selection of a connection destination candidate has been carried out. For example, when topology information is displayed in the display portion 16, as in FIG. 3, when one nodal image is selected from among a plurality of nodal images displayed in the topology information display area 22, by means of an operation of the input portion 19 by the user of its own terminal apparatus, the controller 11 determines that a selection of a connection destination candidate has been carried out. In this way, the controller 11 causes the input portion 19 to function as a connection position selection section, which selects at least one terminal apparatus 2, from among the plurality of terminal apparatus 2 whose participation statuses are displayed in the display portion 16, as a connection destination candidate for its own apparatus in the tree-shaped hierarchical structure.

In the process, if it determines that a selection of a connection destination candidate has been carried out (step S34: Yes), the controller 11 changes the image of the selected connection destination candidate (step S35). For example, as shown in FIG. 3, if the terminal apparatus 2b4 is selected as the connection destination candidate, the controller 11 changes the nodal image corresponding to the terminal apparatus 2b4 from an image of a blank circle to an image of a colored filled-in circle, and displays it.

Meanwhile, if it determines that no selection of a connection destination candidate has been carried out (step S34: No), the controller 11 determines whether or not a selection displaying information on a connection destination candidate has been carried out (step S36). For example, in the condition in which the kind of screen shown in FIG. 3 or FIG. 4 is displayed in the display portion 16, when the user of its own terminal apparatus selects the display button 24 by means of an operation of the input portion 19, the controller 11 determines that a selection displaying information on a connection destination candidate has been carried out. This process being executed in the event that a connection destination candidate has been selected, the process is shifted to step S39 when no connection destination candidate has been selected.

In step S36, if it determines that a selection displaying information on a connection destination candidate has been carried out (step S36: Yes), the controller 11 requests the information on the connection destination candidate from the connection management apparatus 3 via the communication portion 20, and acquires the information on the connection destination candidate via the communication portion 20 (step S37). The information on the connection destination candidate acquired in this way is displayed in the display portion 16 (step S38). For example, as shown in FIG. 4, the record of participation and ranking of participation of the terminal apparatus 2b4, which is the selected connection destination candidate, in the tree-shaped hierarchical structure are displayed. By this means, when participating in the tree-shaped hierarchical structure of the desired distribution channel, it is possible to select the terminal apparatus to be connected as the upper layer apparatus taking into account not only the current time of participation of each terminal apparatus 2, but also its record of participation and ranking of participation.

Meanwhile, when it is determined, in step S36, that no selection displaying information on a connection destination candidate has been carried out (step S36: No), or when the process of step S38 is completed, the controller 11 determines whether or not a selection for participating in the tree-shaped hierarchical structure has been carried out (step S39). For example, in the condition in which the kind of screen shown in FIG. 3 or FIG. 4 is displayed in the display portion 16, when the participate button 25 is selected by means of an operation of the input portion 19 by the user of its own terminal apparatus, the controller 11 determines that a selection for participating in the tree-shaped hierarchical structure has been carried out. This process being executed in the event that a connection destination candidate has been selected, the process is shifted to step S33 when no connection destination candidate has been selected.

If it determines, in step S39, that no selection for participating in the tree-shaped hierarchical structure has been carried out (step S39: No), the controller 11 shifts the process to step S33. Meanwhile, if it determines that a selection for participating in the tree-shaped hierarchical structure has been carried out (step S39: Yes), the controller 11, in order to acquire location information (an IP address and the like) of the connection destination candidate, selected by means of the operation of the input portion 19 by the user, from the connection management apparatus 3, transmits a participation request specifying the connection destination candidate to the connection management apparatus 3, via the communication portion 20. Then, the controller 11 acquires the information on the connection destination candidate transmitted from the connection management apparatus 3 in response to the participation request, via the communication portion 20 (step S40), and connects to the tree-shaped hierarchical structure with the information distribution apparatus 1 or the terminal apparatus 2, which is the connection destination candidate, as the upper layer apparatus (step S41). In this way, the controller 11 functions as the connection section which requests the location information of the connection destination candidate from the connection management apparatus 3, via the communication portion 20 and, based on the location information of the connection destination candidate transmitted from the connection management apparatus 3 in response to the request, connects the connection destination candidate as the upper layer terminal apparatus, via the communication portion 20. After connecting to the tree-shaped hierarchical structure, the controller 11 transmits a participation report to the connection management apparatus 3 (step S42), and completes the connection destination manual setting process.

Figure 8:
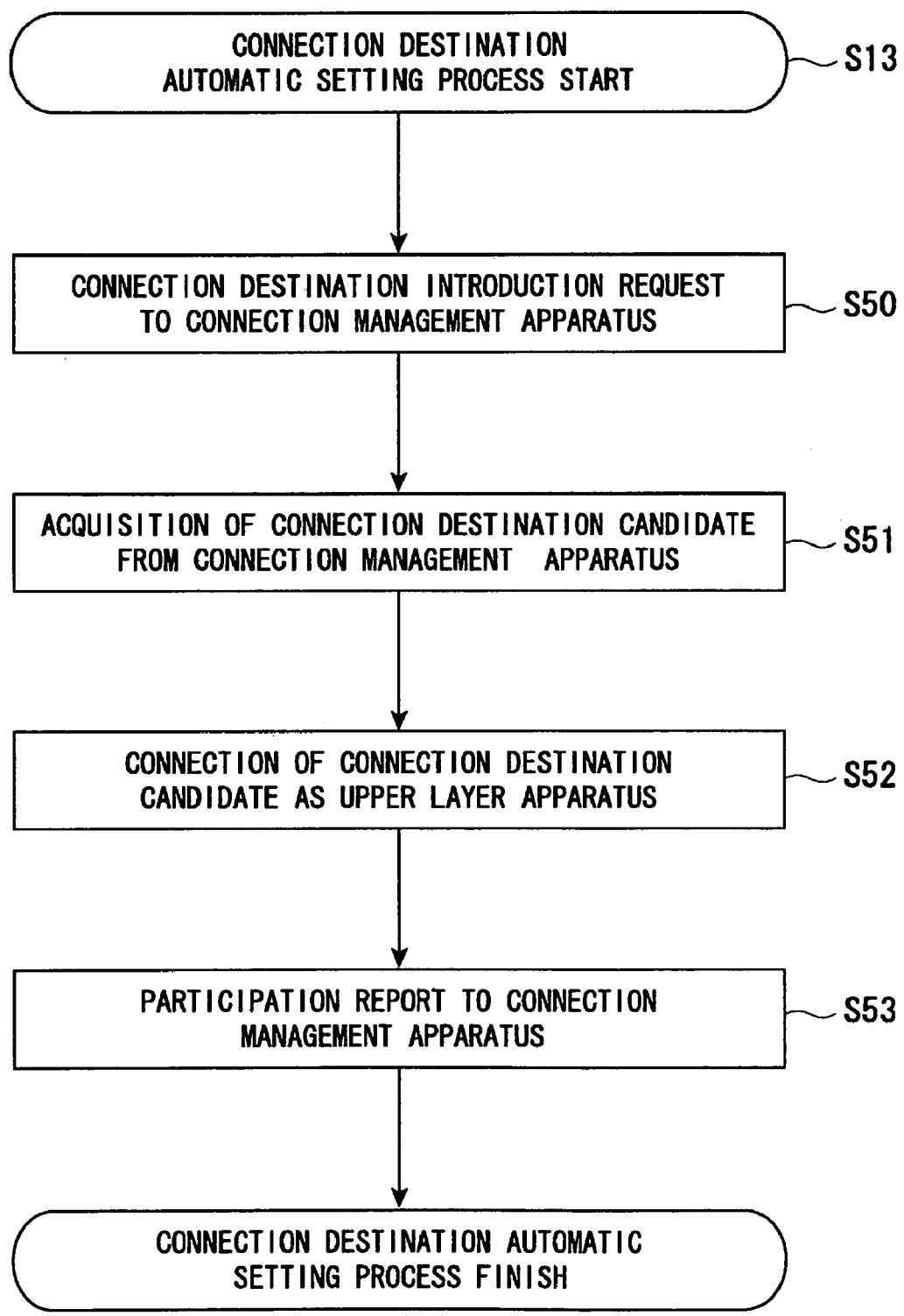
FIG. 8 is a flowchart showing operational details of the terminal apparatus.

Next, a specific description will be given of the connection destination automatic setting process in step S13, referring to the flowchart of FIG. 8. FIG. 8 is a flowchart of the connection destination automatic setting process in the terminal apparatus 2.

As shown in FIG. 8, on starting the connection destination automatic setting process, the controller 11 makes a participation request, which is a connection destination introduction request, to the connection management apparatus 3, via the communication portion 20 (step S50). Information on the distribution channel (when the terminal apparatus 2 has been initialized, this is information on the default distribution channel, while when a switching of the distribution channel has been carried out, it is information on the distribution channel after the switching), for receiving the distribution of the contents information, is included in the connection destination introduction request.

Subsequently, the controller 11 receives location information (an IP address or the like) of a connection destination candidate (the information distribution apparatus 1 or a terminal apparatus 2) from the connection management apparatus 3, via the communication portion 20 (step S51), and participates in the tree-shaped hierarchical structure of a participation destination distribution channel, with the connection destination candidate as an upper layer apparatus (step S52). In this way, the controller 11 functions as an automatic connection section which requests a connection destination candidate of the connection management apparatus 3, receives information on a connection destination candidate from the connection management apparatus 3, and connects to the connection destination candidate.

On participating in the tree-shaped hierarchical structure in this way, the controller 11 transmits a participation report to the connection management apparatus 3, via the communication portion 20 (step S53). Information (for example, a distribution channel number) on the distribution channel, an identification number and location information of its own terminal apparatus, an identification number and location information of the upper layer apparatus, and the like, are included in the participation report.

In this way, the controller 11, in the event that the connection destination automatic setting is selected, connects to a connection destination candidate chosen by the connection management apparatus 3.

Figure 9:
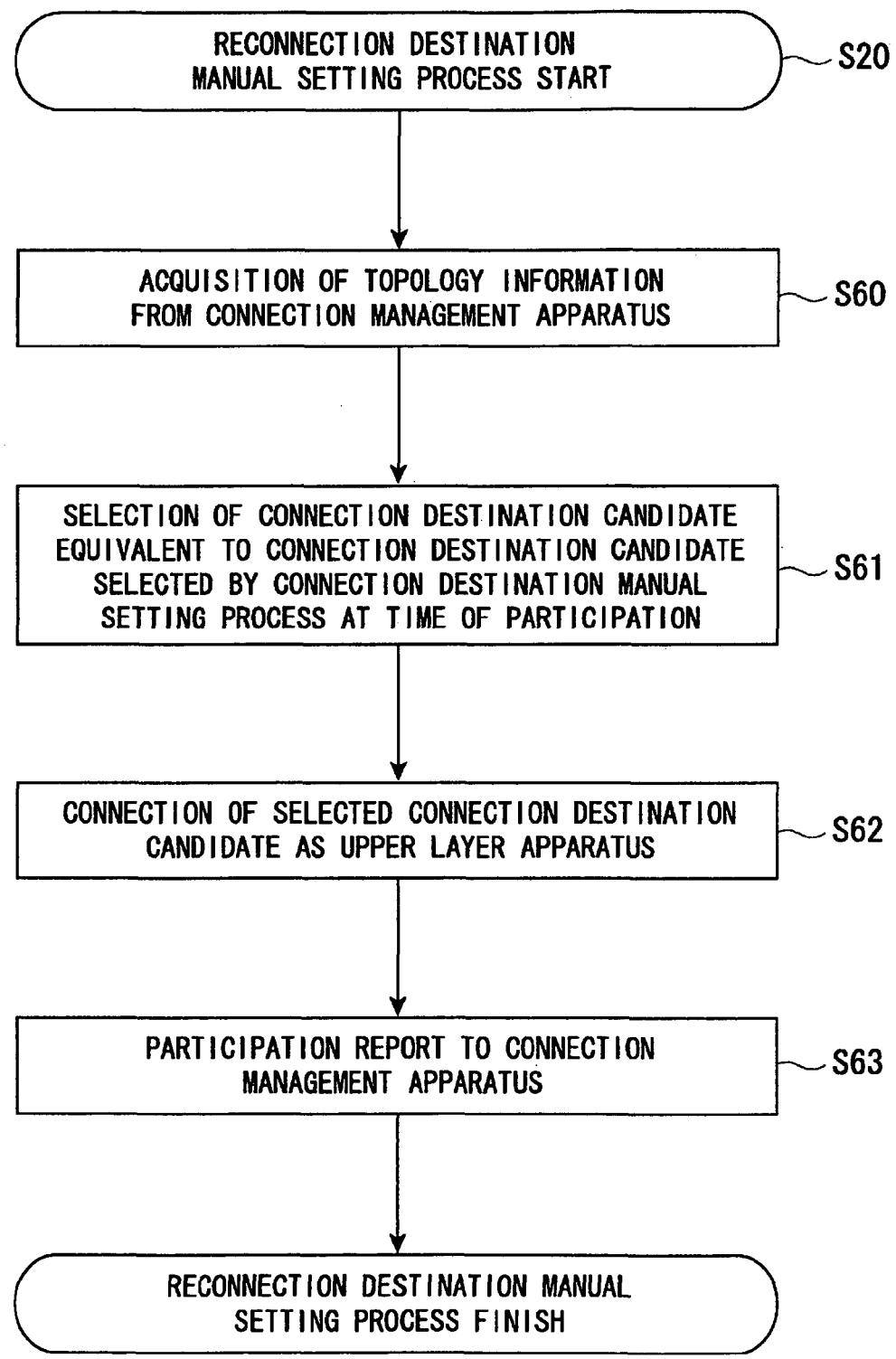
FIG. 9 is a flowchart showing operational details of the terminal apparatus.

Next, a specific description will be given of the reconnection destination manual setting process in step S20, referring to the flowchart of FIG. 9. FIG. 9 is a flowchart of the reconnection destination manual setting process in the terminal apparatus 2.

As shown in FIG. 9, on starting the reconnection destination manual setting process, the controller 11, in order to connect again to (re-participate in) the tree-shaped hierarchical structure of the distribution channel in which the change of connection destination has occurred, requests topology information of the distribution channel from the connection management apparatus 3, via the communication portion 20, and acquires the topology information transmitted from the connection management apparatus 3 in response to the request via the communication portion 20 (step S60).

Subsequently, the controller 11 selects a connection destination candidate equivalent to the connection destination candidate selected in the connection destination manual setting process when participating in the tree-shaped hierarchical structure of the distribution channel in which the change of connection destination has occurred (step S61). For example, as shown in FIG. 3, when selecting the terminal apparatus 2*b*4 as the connection destination candidate in the connection destination manual setting process, as a participation time at the time of selecting the terminal apparatus 2*b*4 has been 18 minutes, the controller 11 selects a terminal apparatus 2 whose current connection time is nearest to 18 minutes (for example, a terminal apparatus whose connection time is 17 minutes) as the connection destination candidate.

Next, the controller 11, by establishing a session and logically connecting via the communication portion 20, with the connection destination candidate selected in this way as the upper layer apparatus, participates in the tree-shaped hierarchical structure (step S62), and subsequently transmits a participation report to the connection management apparatus 3 via the communication portion 20 (step S63). Information (for example, a distribution channel number) on the distribution channel, an identification number and location information of its own terminal apparatus, an identification number and location information of the upper layer apparatus, and the like, are included in the participation report.

In this way, as it is arranged in such a way that the controller 11, in the event that the reconnection destination manual setting is selected, selects and connects to a connection destination candidate equivalent to the connection destination candidate selected in the connection destination manual setting process when participating, the user of the terminal apparatus 2 can avoid the trouble of selecting a reconnection destination candidate again.

Although it has been arranged in such a way that a connection destination candidate equivalent to the connection destination candidate selected in the connection destination manual setting process when participating is selected based on the connection time, as heretofore described, it is also acceptable to arrange in such a way that it is selected based on a record of participation or ranking of participation. Also, it is also acceptable to arrange in such a way that a connection destination candidate is selected based on the connection time and record of participation. For example, it is possible to calculate from the record of participation an average participation time for a time span thereof, and select a connection destination candidate based on a time which is a current connection time subtracted from the average participation time. Regarding this calculation process, it is also acceptable either to arrange in such a way as to calculate from the topology information which the terminal apparatus 2 acquires from the connection management apparatus 3, or to arrange in such a way that the connection management apparatus 3 calculates, and includes a result in the topology information.

Also, it is also acceptable to arrange in such a way that, rather than selecting a connection destination candidate equivalent to the connection destination candidate selected in the connection destination manual setting process when participating, a connection destination candidate which is equivalent or better is selected. For example, as shown in FIG. 3, when selecting the terminal apparatus 2*b*4 as the connection destination candidate in the connection destination manual setting process, as the participation time at the time of selecting the terminal apparatus 2*b*4 has been 18 minutes, the controller 11 selects a terminal apparatus 2 whose current connection time exceeds 18 minutes as the connection destination candidate. However, when there is no terminal apparatus 2 whose current connection time exceeds 18 minutes, the terminal apparatus 2 whose current connection time is nearest to 18 minutes (for example, a terminal apparatus whose connection time is 17 minutes) is selected as the connection destination candidate.

1.4. Specific Configuration and Operations of Connection Management Apparatus

Next, a description will be given, referring to the drawings, of a configuration and operations of the connection management apparatus 3.

Connection Management Apparatus Configuration

Figure 10:
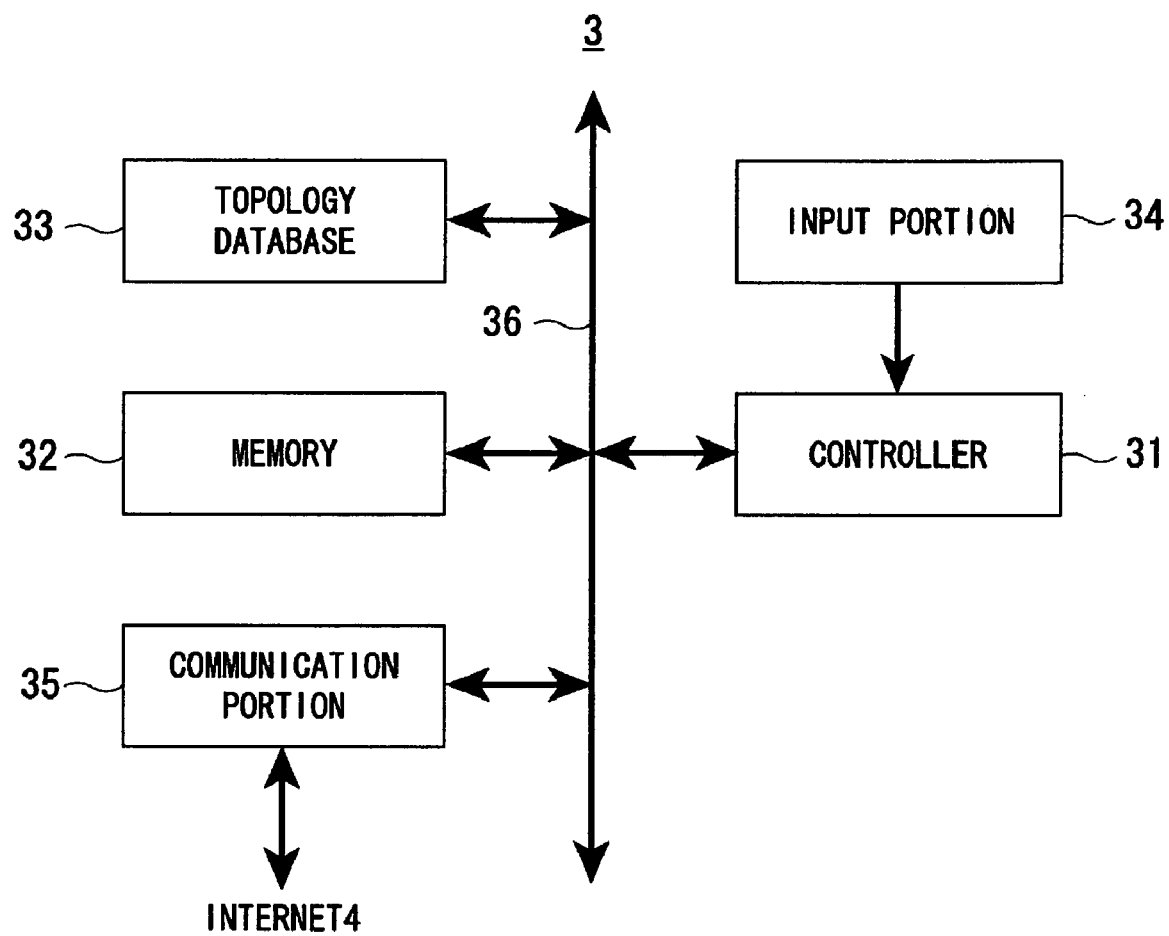
FIG. 10 is a diagram showing an outline configuration of a connection management apparatus.

Firstly, a description will be given of the configuration of the connection management apparatus 3. FIG. 10 is a diagram showing an outline configuration of the connection management apparatus 3 in the information distribution system S according to the embodiment.

The connection management apparatus 3, a general personal computer, as well as a designated computer, being applicable, as shown in FIG. 10, includes a controller 31, a memory 32, in which various kinds of data are rewritable, a topology database 33 (corresponding to one example of a hierarchical structure information storage section and a terminal location information storage section), which stores topology information which is information (location information, connection position information and the like of the terminal apparatus 2) on the tree-shaped hierarchical structure of the distribution channel which its own connection management apparatus 3 manages, an input portion 34, configured of a mouse, a keyboard or the like, and a communication portion 35 for communicating with the information distribution apparatus 1 and the terminal apparatus 2, via the internet 4. The controller 31, the memory 32, the topology database 33 and the communication portion 35 are mutually connected via a system bus 36.

The controller 31 is configured of a CPU (Central Processing Unit), an internal ROM (Read Only Memory), and an internal RAM (Random Access Memory). An information processing program for managing the tree-shaped hierarchical structure of the information distribution system S being stored in the internal ROM, the CPU, by retrieving and executing the information processing program stored in the internal ROM, functions as a hierarchical structure information transmission section, a terminal location information transmission section, a connection destination candidate selection section, a connection destination candidate information transmission section and the like, to be described hereafter.

It is acceptable both that the information processing program is, for example, downloaded into the internal ROM of the controller 31 from a server (not shown) connected to the internet 4, via the communication portion 35, and that, after being recorded on a computer readable recording medium such as a CD-ROM, it is written onto the internal ROM of the controller 31 via an unshown recording medium drive. In this case, it is desirable that the internal ROM is configured of a flash memory or the like.

Connection Management Apparatus 3 Operations

Figure 11:
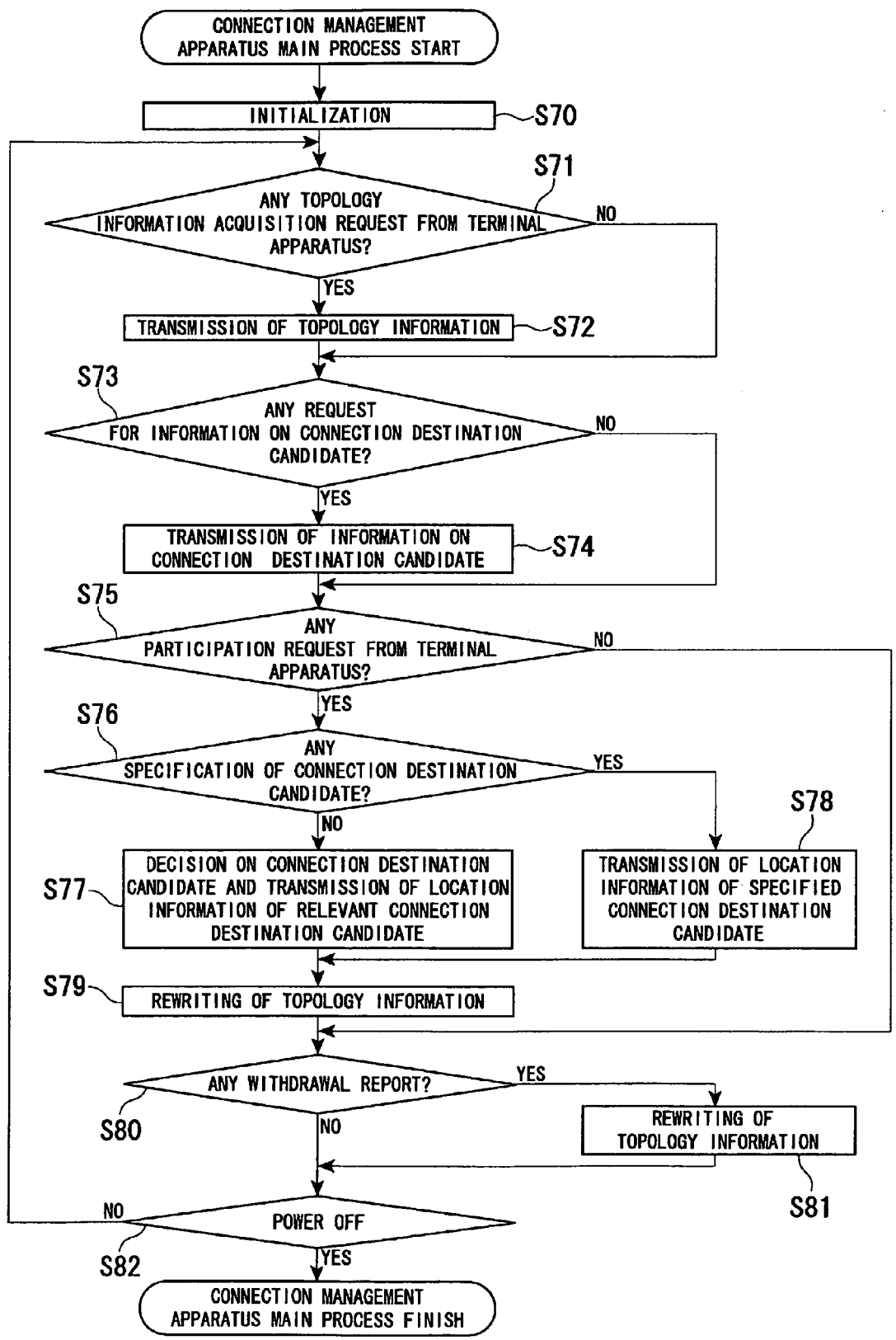
FIG. 11 is a flowchart showing operational details of the connection management apparatus.

A specific description will be given of the operations of the connection management apparatus 3 configured in the heretofore described way. FIG. 11 is a flowchart showing operational details of the connection management apparatus 3. Each of the following processes is executed by the controller 31 of the connection management apparatus 3 functioning as the heretofore described sections and the like.

As shown in FIG. 11, when a main power switch (not shown) is activated, or when a reset switch (not shown) is operated, on the connection management apparatus 3, the CPU of the controller 31 executes an initial setting operation of access permission for the memory 32, internal RAM working area allocation and the like, retrieves the information processing program stored in the internal ROM, puts the functions as the controller 31 in an operating condition (step S70), and moves the process to step S71.

Subsequently, the controller 31 determines whether or not there is a topology information acquisition request (step S71). Whether or not there is a topology information acquisition request is determined by whether or not the controller 31 has received a topology information acquisition request from a terminal apparatus 2, via the communication portion 35.

In the process, if it determines that there has been a topology information acquisition request (step S71: Yes), the controller 31 retrieves topology information of the distribution channel corresponding to the request from the topology database 33, and transmits it to the terminal apparatus 2 which is the request source, via the communication portion 35 (step S72). In this way, the controller 31 functions as the hierarchical structure information transmission section which, in response to the request from the terminal apparatus 2, retrieves topology information which is information on the tree-shaped hierarchical structure of the distribution channel corresponding to the request from the topology database 33, and transmits it to the terminal apparatus 2 which is the request source.

As well as connection position information of each terminal apparatus 2 configuring the tree-shaped hierarchical structure, a current time of participation in the tree-shaped hierarchical structure of each terminal apparatus 2 is included in the topology information in this case. The information being managed by the controller 31, the connection position information and the participation time are generated by the controller 31, based on a participation report or a withdrawal report transmitted from each terminal apparatus 2. Also, the record of participation and ranking of participation are also generated in the same way by the controller 31, based on the participation report or the withdrawal report transmitted from each terminal apparatus 2, and managed by the controller 31.

When it is determined, in step S71, that there is no topology information acquisition request (step S71: No), or when the process of step S72 is completed, the controller 31 determines whether or not there is a request for information on a connection destination candidate (step S73). Whether or not there is a request for information on a connection destination candidate is determined by whether or not the controller 31 has received a connection destination candidate acquisition request from a terminal apparatus 2, via the communication portion 35.

In the process, if it determines that there has been a request for information on a connection destination candidate (step S73: Yes), the controller 31 retrieves the required information (the record of participation, the ranking of participation and the like) on the connection destination candidate from the topology database 33, and transmits it to the terminal apparatus 2 which is the request source, via the communication portion 35 (step S74).

Next, the controller 31 determines whether or not there is a request from the terminal apparatus 2 to participate in the tree-shaped hierarchical structure (step S75). Whether or not there is a request to participate in the tree-shaped hierarchical structure is determined by whether or not the controller 31 has received a request to participate in the tree-shaped hierarchical structure, designating a distribution channel, from the terminal apparatus 2, via the communication portion 35.

In the process, if it determines that there is a request from the terminal apparatus 2 to participate in the tree-shaped hierarchical structure (step S75: Yes), the controller 31 determines whether or not there is a specification of the connection destination candidate (a specification of the connection position) in the participation request (step S76). In the process, if it determines that there is a specification of the connection destination candidate in the participation request (step S76: Yes), the controller 31 retrieves the location information of the specified terminal apparatus 2 from the topology database 33, and transmits it via the communication portion 35 (step S78). In this way, the controller 31 functions as the terminal location information transmission section, which retrieves the location information of the connection destination candidate requested by the terminal apparatus 2 from the topology database 33, which is the terminal location information storage section, and transmits it to the terminal apparatus 2 which is the request source.

Meanwhile, if it determines that there is no specification of the connection destination candidate in the participation request (step S76: No), the controller 31, referring to the topology database 33, decides on a connection destination candidate to which the terminal apparatus 2 which has made the participation request is to connect as the upper layer apparatus, and transmits the location information of the connection destination candidate to the terminal apparatus 2 which has made the participation request, via the communication portion 35 (step S77). In this way, the controller 31, in response to the request from the terminal apparatus 2, functions as the connection destination candidate selection section, which decides on a connection destination candidate, and as the connection destination candidate information transmission section, which transmits information on the connection destination candidate decided on in this way to the terminal apparatus 2 which is the request source.

On the process of step S77 or the process of step S78 finishing, the controller 31 receives a participation report from the terminal apparatus 2, via the communication portion 35, and rewrites the topology information based on the participation report (step S79). The rewriting of the topology information is carried out by retrieving the topology information from the topology database 33, and overwriting the topology database 33 with topology information in which the terminal apparatus 2 which has made the participation report is added to the retrieved topology information. When the process of step S79 is completed, or when it is determined in step S75 that there is no request from the terminal apparatus 2 to participate in the tree-shaped hierarchical structure (step S75: No), the controller 31 determines whether or not there is a withdrawal report (step S80). In the process, the controller 31 determines that there is a withdrawal report when it has received a withdrawal report from a terminal apparatus 2 via the communication portion 35.

If it determines, in step S80, that there is a withdrawal report (step S80: Yes), the controller 31, in response to the withdrawal report, rewrites the topology information (step S81). The rewriting of the topology information is carried out by retrieving the topology information from the topology database 33, and overwriting the topology database 33 with topology information in which the terminal apparatus 2 which has made the withdrawal report is deleted from the retrieved topology information.

When it is determined, in step S80, that there is no withdrawal report (step S80: No), or when the process of step S81 is completed, the controller 31 determines whether or not the power of its own connection management apparatus has shifted to an inactivated condition (step S82).

If it determines, in step S82, that the power of its own connection management apparatus 3 has shifted to the inactivated condition (step S82: Yes), the controller 31 completes the main process, while if it determines that the power of its own connection management apparatus 3 has not shifted to the inactivated condition (step S82: No), the controller 31 repeats the process from step S71.

In this way, the connection management apparatus 3 in the embodiment, when receiving a participation request from a terminal apparatus 2, in the event that there is a specified connection destination candidate in the participation request, transmits the location information of the connection destination candidate, by which means the terminal apparatus 2 can connect to the specified connection destination candidate, and participate in the tree-shaped hierarchical structure. Also, in the event that there is no specified connection destination candidate in the participation request, the connection management apparatus 3 decides on a connection destination candidate by itself, and transmits the location information of the connection destination candidate, by which means the terminal apparatus 2 can participate in the tree-shaped hierarchical structure, even when it has not specified a connection destination candidate.

2. Second Embodiment

Figure 12:
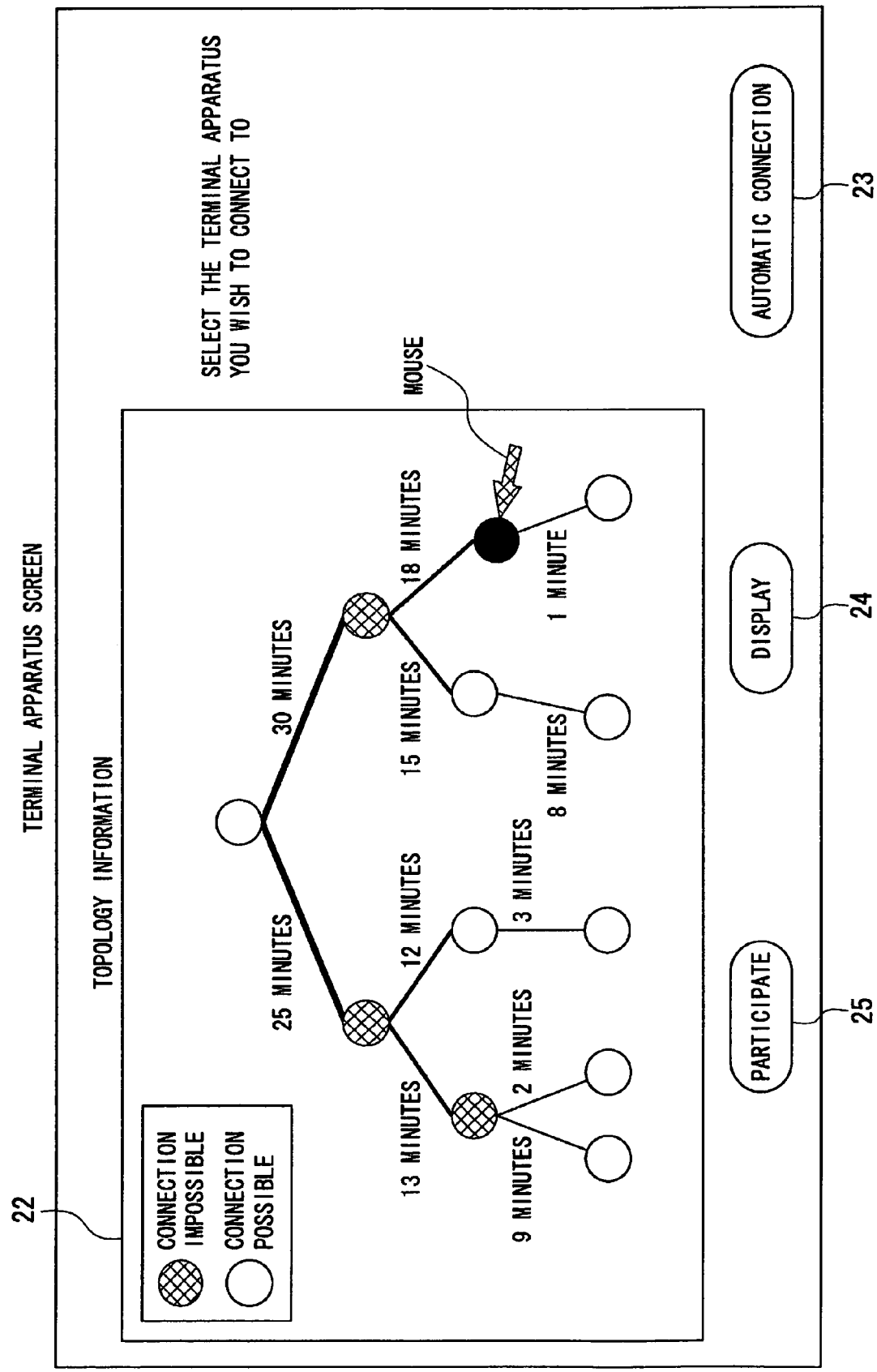
FIG. 12 is a diagram showing an example of a screen displayed in a display portion of a non-participating terminal apparatus when the non-participating terminal apparatus participates in the information distribution system in a second embodiment.

In the heretofore described first embodiment, as shown in FIG. 3, with the plurality of terminal apparatus 2 participating in the tree-shaped hierarchical structure as the "nodal images", and the connections between the information distribution apparatus 1 and the terminal apparatus 2, and between the terminal apparatus 2, as the "branch images", the condition of the tree-shaped hierarchical structure is displayed in the display portion 16 in the topology information display area 22, but in a second embodiment, it is arranged in such a way that the "branch images" are images which correspond to current times of participation in the tree-shaped hierarchical structure of lower layer terminal apparatus 2 connected by the branches. For example, as shown in FIG. 12, in the event that the current time of participation is long, the "branch image" is an image of a thick branch, while in the event that the current time of participation is short, the "branch image" is an image of a thin branch. Consequently, a user of a terminal apparatus 2 being able to intuitively know a stability factor of a terminal apparatus 2 from the thickness of the branch in the "branch image", it is extremely convenient. The process is executed by the controller 11 functioning as the hierarchical structure information display processing section.

Also, it is also acceptable to arrange in such a way as to, rather than change the "branch images" in accordance with the current time of participation, change them in accordance with a record of participation or a ranking of participation. For example, a branch is made a thick image between a terminal apparatus 2 with a high ranking of participation and a terminal apparatus 2 on an upper layer thereof, while a branch is made a thin image between a terminal apparatus 2 with a low ranking of participation and a terminal apparatus 2 on an upper layer thereof.

Also, it is also acceptable to arrange in such a way that, rather than displaying a participation status of the terminal apparatus 2 by the thickness of the branch, a color is changed depending on the participation status of the terminal apparatus 2. For example, it is acceptable to arrange in such a way that, as a current connection time becomes longer, the color of the "branch image" changes in an order of red to yellow to green.

It is also acceptable, rather than displaying the "branch image" as a shape or color of branch corresponding to one of the current time of participation, record of participation or ranking of participation, to evaluate a stability thereof from a combination of two or more of the current time of participation, record of participation and ranking of participation, and make it a "branch image" of a color or thickness corresponding to the stability.

3. Third Embodiment

In the heretofore described second embodiment, it is arranged in such a way that the participation status of each terminal apparatus 2 in the tree-shaped hierarchical structure is displayed as a shape or color of branch corresponding to at least one of the current time of participation, record of participation or ranking of participation of each terminal apparatus 2 in the tree-shaped hierarchical structure, but in a third embodiment, the participation status of each terminal apparatus 2 in the tree-shaped hierarchical structure is displayed as a shape or color of node corresponding to at least one of the current time of participation, record of participation or ranking of participation of each terminal apparatus 2 in the tree-shaped hierarchical structure. Consequently, a user of a terminal apparatus 2 being able to intuitively know a stability factor of a terminal apparatus 2 from the shape or color of the "nodal image", it is extremely convenient. The process is executed by the controller 11 functioning as the hierarchical structure information display processing section.

Figure 13:
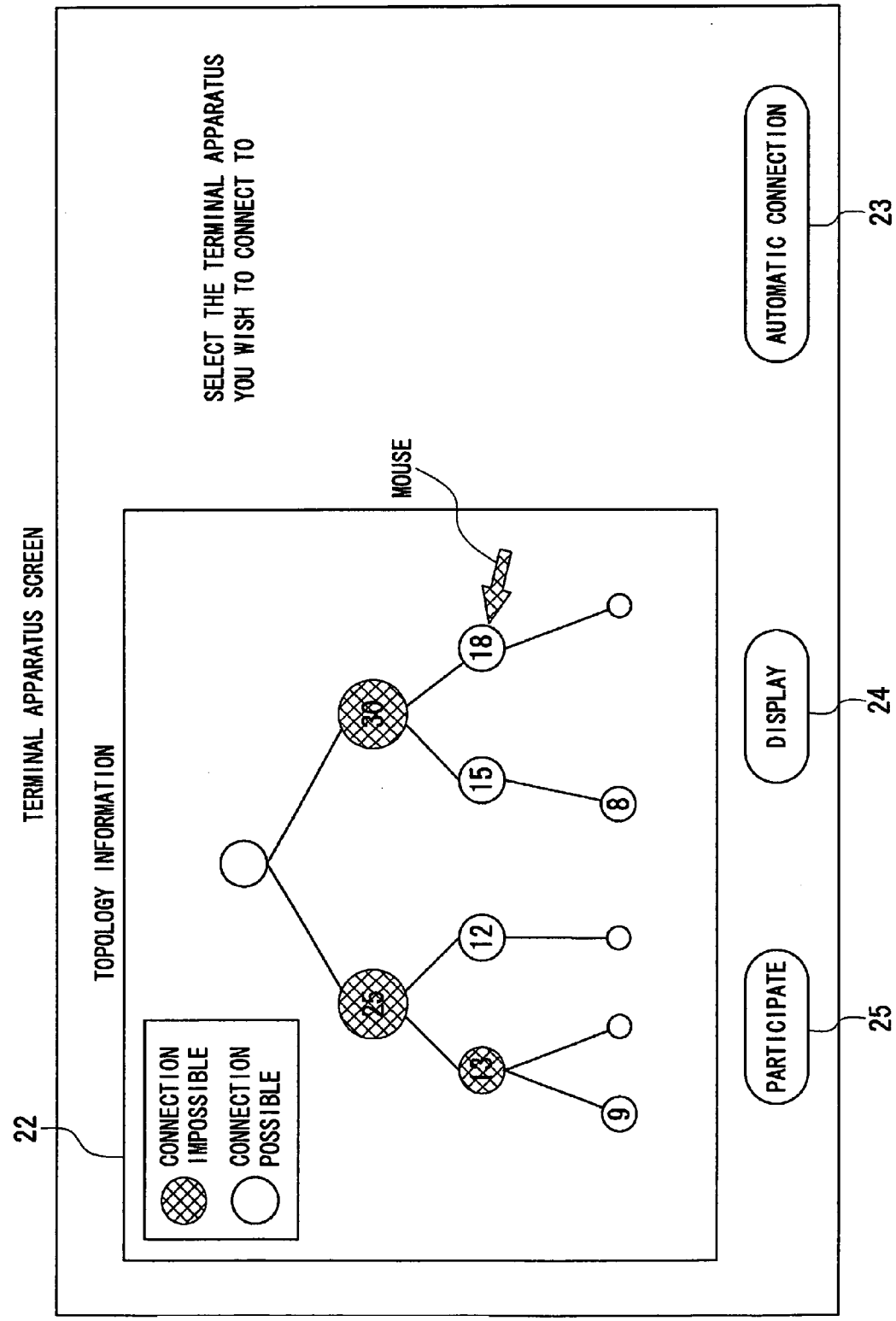
FIG. 13 is a diagram showing an example of a screen displayed in a display portion of a non-participating terminal apparatus when the non-participating terminal apparatus participates in the information distribution system in a third embodiment.

A change of the shape of the "nodal image" is that, for example, as shown in FIG. 13, the "nodal image" of a terminal apparatus 2 whose current time of participation is long is an image of a large node, while the "nodal image" of a terminal apparatus 2 whose current time of participation is short is an image of a small node. Also, a change of the color of the "nodal image" is that, for example, as a current connection time becomes longer, the color of the "nodal image" changes in an order of red to yellow to green.

4. Other Embodiments

In the first embodiment, it is arranged in such a way that, in the area neighboring each branch displayed in the topology information display area 22, the current time of participation in the tree-shaped hierarchical structure of the terminal apparatus 2 connected by the branch is displayed, but it is also acceptable to arrange in such a way as to display a ranking of participation in the "nodal images", as shown in FIG. 14.

Also, in the heretofore described embodiments, a description has been given of an example of selecting one connection destination candidate in the connection destination manual setting process, but it is also acceptable to arrange in such a way that it is possible to select two or more connection destination candidates, as shown in FIG. 15. In this case, the controller 11 of the terminal apparatus 2 requests the location information of the two or more selected connection destination candidates from the connection management apparatus 3, attempts a connection to one of the connection destination candidates whose location information it has acquired and, when the connection is possible, does not carry out a connection to the other connection destination candidates, while when the connection to that connection destination candidate is not possible, it attempts a connection to a next connection destination candidate.

As it is possible to select two or more connection destination candidates in this way, even in a case in which it is not possible to connect to one connection destination candidate, due to congestion of the network or the like, it is possible to eliminate a bother of selecting a connection destination candidate again.

Also, it is also acceptable to arrange in such a way as to cause the controller 31 of the connection management apparatus 3 to function as a calculation section, which calculates a predicted participation continuity time from a current time of participation and record of participation, and make a participation status of each terminal apparatus 2 this predicted participation continuity time. In this case, the controller 11 of the terminal apparatus 2 displays the predicted participation continuity time instead of a current connection time or the like. By this means, it becomes easy for the user of the terminal apparatus 2 to distinguish a stable terminal apparatus 2.

Also, in the heretofore described embodiments, it is taken that the ranking of participation is done for all the terminal apparatus 2 which have a right to participate in the information distribution system S, but it is also acceptable to arrange in such a way as to establish an order of the ranking of participation with the terminal apparatus 2 participating in the tree-shaped hierarchical structure.

Also, in the heretofore described embodiments, a description has been given with the distribution topology as the tree-shaped hierarchical structure but, not being limited to this, it is also acceptable to arrange in such a way that the plurality of terminal apparatus 2 are logically connected, multilayered in a chain-shaped hierarchical structure.

For example, although a description has been given with the IP address as an example of the location information of the terminal apparatus 2, as long as it is possible to specify a position on the network, it is also acceptable to include a port number, as well as the IP address, as the location information.

Although the embodiment and modification of the present invention have been described in detail herein, the scope of the invention is not limited thereto. It will be appreciated by those skilled in the art that various modifications may be made without departing from the scope of the invention. Accordingly, the embodiment and modification disclosed herein are only exemplary. It is to be understood that the scope of the invention is not to be limited thereby, but is to be determined by the claims which follow.

What is claimed is:

1. An information distribution system, comprising:
an information distribution apparatus which distributes contents information via a network;
a plurality of terminal apparatuses which are logically connected, multilayered in a hierarchical structure on the network, with the information distribution apparatus as an apex; and
a connection management apparatus which manages information on the hierarchical structure,
the contents information distributed from the information distribution apparatus being sequentially relayed to a lower layer terminal apparatus by means of a relaying function of the terminal apparatus, wherein
the terminal apparatuses includes:
a hierarchical structure request section which, before participating in the hierarchical structure, requests the information on the hierarchical structure from the connection management apparatus, wherein the information on the hierarchical structure is used to select a terminal apparatus to be connected;
a hierarchical structure information display section which, based on the information on the hierarchical structure acquired from the connection management apparatus, controls a display portion that the display portion displays participation statuses in the hierarchical structure of the plurality of terminal apparatus configuring the hierarchical structure;
a connection position selection section which selects at least one terminal apparatus, among the plurality of terminal apparatus whose participation statuses are displayed in the display portion, as a connection destination candidate in the hierarchical structure; and
a connection section which connects the selected connection destination candidate as an upper layer terminal apparatus, and wherein
the connection management apparatus includes:
a hierarchical structure information storage section which stores the information on the hierarchical structure; and
a hierarchical structure information transmission section which, in response to the request from the terminal apparatus, retrieves the information on the hierarchical structure from the hierarchical structure information storage section, and transmits the information on the hierarchical structure to the terminal apparatus.

2. The information distribution system according to claim 1, wherein
the connection section of the terminal apparatus requests location information of the connection destination candidate from the connection management apparatus and, based on the location information transmitted from the connection management apparatus in response to the request, selects the connection destination candidate, and
the connection management apparatus further includes:
a terminal location information storage section which stores location information of the terminal apparatus configuring the hierarchical structure; and
a terminal location information transmission section which retrieves the location information of the connection destination candidate requested by the terminal apparatus from the terminal location information storage section, and transmits the location information to the terminal apparatus which is the request source.

3. The information distribution system according to claim 1, wherein
information on at least one of a current time of participation, record of participation and ranking of participation in the hierarchical structure of terminal apparatus configuring the hierarchical structure is included in the information on the hierarchical structure, and
the hierarchical structure information display section controls the display portion that the display portion displays the information on at least one of the current time of participation, record of participation and ranking of participation in the hierarchical structure of each terminal apparatus as the participation statuses in the hierarchical structure of the plurality of terminal apparatus.

4. The information distribution system according to claim 1, wherein
the hierarchical structure information display section controls the display portion that the display portion displays the hierarchical structure with the plurality of terminal apparatus as nodal images, and connections between the terminal apparatus as branch images, and displays the participation status in the hierarchical structure of each terminal apparatus as a shape or color of node corresponding to at least one of the current time of participation, record of participation and ranking of participation in the hierarchical structure of each terminal apparatus.

5. The information distribution system according to claim 1, wherein
the hierarchical structure information display section controls the display portion that the display portion displays the hierarchical structure with the plurality of terminal apparatus as the nodal images, and the connections between the terminal apparatus as the branch images, and displays the participation status in the hierarchical structure of terminal apparatus as a shape or color of branch corresponding to at least one of the current time of participation, record of participation and ranking of participation in the hierarchical structure of the terminal apparatus.

6. A terminal apparatus in an information distribution system which includes: an information distribution apparatus which distributes contents information via a network; a plurality of terminal apparatus which are logically connected, multilayered in a hierarchical structure on the network, with the information distribution apparatus as an apex; and a connection management apparatus which manages information on the hierarchical structure, and in which the contents information distributed from the information distribution apparatus is sequentially relayed to a lower layer terminal apparatus by means of a relaying function of the terminal apparatus, the terminal apparatus comprising:
a hierarchical structure request section which, before participating in the hierarchical structure, requests the information on the hierarchical structure from the connection management apparatus, wherein the information on the hierarchical structure is used to select a terminal apparatus to be connected;
a hierarchical structure information display section which, based on the information on the hierarchical structure acquired from the connection management apparatus, controls a display portion such that the display portion displays participation statuses in the hierarchical structure of the plurality of terminal apparatus configuring the hierarchical structure;
a connection position selection section which selects at least one terminal apparatus, among the plurality of terminal apparatus whose participation statuses are displayed in the display portion, as a connection destination candidate in the hierarchical structure; and
a connection section which connects the selected connection destination candidate as an upper layer terminal apparatus.

7. A non-transitory computer-readable storage medium that stores a computer-executable program, the program causes a computer to function as the terminal apparatus described in claim 6.

8. An information processing method in an information distribution system which includes: an information distribution apparatus which distributes contents information via a network; a plurality of terminal apparatuses which are logically connected, multilayered in a hierarchical structure on the network, with the information distribution apparatus as an apex; and a connection management apparatus which manages information on the hierarchical structure, and in which the contents information distributed from the information distribution apparatus is sequentially relayed to a lower layer terminal apparatus by means of a relaying function of the terminal apparatuses, the method comprising:
storing the information on the hierarchical structure in a hierarchical structure information storage section, the information being stored by the connection management apparatus;
before participating in the hierarchical structure, requesting the information on the hierarchical structure from the connection management apparatus, the information being requested by one of the terminal apparatuses, wherein the information on the hierarchical structure is used to select a terminal apparatus to be connected;
in response to the request from the terminal apparatus, retrieving the information on the hierarchical structure from the hierarchical structure information storage section, and transmitting the information on the hierarchical structure to the terminal apparatus, the information being retrieved and transmitted by the connection management apparatus;
based on the information on the hierarchical structure acquired from the connection management apparatus, controlling a display portion that the display portion display participation statuses in the hierarchical structure of the plurality of terminal apparatus configuring the hierarchical structure, the display portion being controlled by the terminal apparatus that requested the information on the hierarchical structure;

selecting at least one terminal apparatus, among the plurality of terminal apparatus whose participation statuses are displayed in the display portion, as a connection destination candidate in the hierarchical structure, the selecting being performed by the terminal apparatus that requested the information on the hierarchical structure; and connecting the selected connection destination candidate as an upper layer terminal apparatus, connecting being performed by the terminal apparatus that requested the information on the hierarchical structure.

9. The information distribution system according to claim 1, wherein the connection management apparatus is different from the plurality of terminal apparatuses.

10. The terminal apparatus according to claim 6, wherein the connection management apparatus is different from the plurality of terminal apparatuses.

11. The information processing method according to claim 8, wherein the connection management apparatus is different from the plurality of terminal apparatuses.

* * * * *